US007313782B2

(12) United States Patent
Lurie et al.

(10) Patent No.: US 7,313,782 B2
(45) Date of Patent: *Dec. 25, 2007

(54) METHOD FOR DISTRIBUTING, INTEGRATING, AND HOSTING A SOFTWARE PLATFORM

(75) Inventors: Marc Lurie, Austin, TX (US); Michael T. Loos, Glendale, AZ (US)

(73) Assignee: @Hand Corporation, Austin, TX (US)

( * ) Notice: Subject to any disclaimer, the term of this patent is extended or adjusted under 35 U.S.C. 154(b) by 560 days.

This patent is subject to a terminal disclaimer.

(21) Appl. No.: 09/848,952

(22) Filed: May 3, 2001

(65) Prior Publication Data

US 2002/0116698 A1 Aug. 22, 2002

Related U.S. Application Data

(60) Provisional application No. 60/202,351, filed on May 5, 2000.

(51) Int. Cl.
  *G06F 9/44* (2006.01)
  *G06F 17/30* (2006.01)
(52) U.S. Cl. .................... 717/104; 717/106; 717/168; 707/10
(58) Field of Classification Search ................ 717/104, 717/174, 106, 168; 707/103; 711/10
See application file for complete search history.

(56) References Cited

U.S. PATENT DOCUMENTS

| 5,295,222 A | * | 3/1994 | Wadhwa et al. | ............ 717/104 |
| 5,604,906 A | * | 2/1997 | Murphy et al. | ............ 717/162 |
| 5,671,436 A | | 9/1997 | Morris et al. | |
| 5,704,029 A | | 12/1997 | Wright, Jr. | |
| 5,857,201 A | * | 1/1999 | Wright et al. | ............ 707/104.1 |
| 5,960,200 A | * | 9/1999 | Eager et al. | ................ 717/147 |
| 6,119,155 A | | 9/2000 | Rossmann et al. | |
| 6,178,425 B1 | | 1/2001 | Brodersen et al. | .......... 707/101 |
| 6,189,011 B1 | | 2/2001 | Lim et al. | ................... 707/102 |
| 6,199,195 B1 | * | 3/2001 | Goodwin et al. | ........... 717/104 |
| 6,226,650 B1 | | 5/2001 | Mahajan et al. | ............ 707/201 |

(Continued)

FOREIGN PATENT DOCUMENTS

WO    WO 00/31664    *    2/2000

OTHER PUBLICATIONS

Michael Juntao Yuan, "Enterprise J2ME: Developing Mobile Java Applications", Oct. 2003, Prentice Hall PTR, ISBN: 0131405306, Chapter 7.*

(Continued)

*Primary Examiner*—Tuan Dam
*Assistant Examiner*—J. Derek Rutten

(57) ABSTRACT

Various methods for distributing, integrating, and hosting a software platform that may be used to extend an enterprise network to mobile devices are provided. A particular embodiment of the method includes distributing a software platform to a first enterprise and distributing the software platform to a second enterprise. The software platform is for use in connection with an enterprise computing system having a plurality of back-end software applications. The software platform includes a data modeling program allowing creation of a data model associated with at least one of the plurality of back-end applications. The software platform further includes a deployment feature allowing deployment of at least a portion of the data model to a plurality of mobile computing devices.

31 Claims, 16 Drawing Sheets

U.S. PATENT DOCUMENTS

| | | | |
|---|---|---|---|
| 6,324,542 B1 | 11/2001 | Wright, Jr. et al. | |
| 6,332,163 B1 | 12/2001 | Bowman-Amuah | |
| 6,336,137 B1 | 1/2002 | Lee et al. | |
| 6,343,265 B1 * | 1/2002 | Glebov et al. | 703/25 |
| 6,356,905 B1 | 3/2002 | Gershman et al. | |
| 6,421,717 B1 | 7/2002 | Kloba et al. | |
| 6,438,544 B1 * | 8/2002 | Grimmer et al. | 707/5 |
| 6,546,425 B1 | 4/2003 | Hanson et al. | |
| 6,549,917 B1 | 4/2003 | Pollard et al. | |
| 6,598,167 B2 | 7/2003 | Devine et al. | |
| 6,629,143 B1 | 9/2003 | Pang | |
| 6,636,873 B1 * | 10/2003 | Carini et al. | 707/201 |
| 6,700,590 B1 | 3/2004 | DeMesa et al. | |
| 6,721,288 B1 | 4/2004 | King et al. | |
| 6,721,787 B1 | 4/2004 | Hiscock | |
| 6,754,670 B1 * | 6/2004 | Lindsay et al. | 707/100 |
| 6,766,326 B1 | 7/2004 | Cena | |
| 6,829,655 B1 | 12/2004 | Huang et al. | |
| 6,847,146 B2 | 1/2005 | Hessenberger et al. | |
| 6,874,146 B1 * | 3/2005 | Iyengar | 719/313 |
| 6,880,126 B1 * | 4/2005 | Bahrs et al. | 715/526 |
| 7,188,332 B2 * | 3/2007 | Charisius et al. | 717/104 |
| 2001/0020255 A1 | 9/2001 | Hofmann et al. | |
| 2002/0033843 A1 | 3/2002 | Loos et al. | |
| 2002/0049858 A1 | 4/2002 | Frietas et al. | |
| 2002/0057803 A1 | 5/2002 | Loos et al. | |
| 2002/0147611 A1 * | 10/2002 | Greene et al. | 705/1 |
| 2003/0069874 A1 | 4/2003 | Hertzog et al. | |
| 2004/0024610 A1 | 2/2004 | Fradkov et al. | |

OTHER PUBLICATIONS

Castro, Giraud, Konuru, Purakayastha, and Yeh, "A Programming Framework for Mobilizing Enterprise Applications", Dec. 2004, Mobile Computing Systems and Applications, 2004. WMCSA 2004. Sixth IEEE Workshop on.*

Martin, "Principles of Object-Oriented Analysis and Design", 1993, Prentice Hall, Chapters 7 and 19.*

Shannon, B. et al., "Java 2 Platform Enterprise Edition Specification, v1.2", (Dec. 1999), Sun Microsystems, Inc., Chapters 1, 2, 3 and 4.

Engerman, G. et al., "Effective ue of wireless data communications", *International Journal of Network Management*, (Feb. 1998), 8(1):2-11.

* cited by examiner

US 7,313,782 B2

METHOD FOR DISTRIBUTING, INTEGRATING, AND HOSTING A SOFTWARE PLATFORM

REFERENCE TO CO-PENDING APPLICATIONS

This application is a continuation-in-part of U.S. Provisional Application Ser. No. 60/202,351, filed May 5, 2000, which is incorporated herein by reference in its entirety.

FIELD OF THE INVENTION

The present invention relates generally to enterprise wireless networking and, more specifically, to methods of distributing, integrating, and hosting a software platform to support enterprises to extend their back-end systems to mobile devices.

BACKGROUND OF THE INVENTION

Advances in mobile device technology and connectivity protocols provide enterprises with an opportunity to shift automated business processes to a mobile workforce. Unfortunately, the currently available techniques for accomplishing this objective are inflexible and overly reliant on persistent connectivity.

Conventional options, such as wireless web-based connectivity, data synchronization technology, and in-house developed solutions, have substantial disadvantages. Wireless web solutions often utilize a thin-client, browser-based interface that has, for the most part, proven unworkable. The wireless web model is highly connection-dependent. To work effectively, the connection between the thin-client and the network server should remain in place the entire time an application is in use by the mobile device. It is very difficult for mobile clients to remain connected or to guarantee connectivity for extended amounts of time. Mobile devices may only connect occasionally, and when they do connect, the connection may be for a very limited amount of time. As a result, existing web-based technologies based on persistent network connections provide a sub-optimal solution for extending an enterprise network to mobile devices.

The data synchronization ("data synch") model may improve upon the wireless web-based model with respect to the non-persistent nature of mobile device connectivity. However, data synch methods often lack flexibility and usually offer very little, if any, application management capability. A typical data synch method shuttles information between handheld computers on the front-end and a corporate database on the back-end. The shuttling conventionally occurs through hard-wired data pipes referred to as data conduits, adapters or plug-ins. These conduits are difficult to create and manage because they operate in and link two very distinct environments. The first environment surrounds the mobile device and potentially includes multiple operating systems, memory footprints, and file system architectures. The second environment surrounds the enterprise back-end data sources. Each environment typically has different interface methodologies and connectivity capabilities. The conduits are hard-wired and difficult to change. As such, the entire data synch system may need to be rewritten each time new enterprise back-ends are brought on-line or members of the mobile work force choose to move to more powerful mobile devices. As such, many organizations find conventional data-synch solutions to be too inflexible to be practical.

A third conventional option, in-house development, also faces the technical disadvantage of inflexibility. The development of such systems often requires excessive amounts of in-house, custom developed software and hardware. As a result, system development projects consume considerable amounts of time, money and manpower. While these conventional systems may be impressive in their scope and level of integration, modifying their functionality can require re-writing entire blocks of code. And, if the original programmers are not available, the schedule for modifying custom code can be significantly lengthened as new programmers "back-out" the processes and flows of the original code.

Accordingly, there is a need for improved methods to support enterprises in their efforts to extend enterprise networks to mobile devices.

SUMMARY OF THE INVENTION

In accordance with the teachings of the present invention, various methods for distributing, integrating, and hosting a software platform that may be used to extend an enterprise network to mobile devices are provided. A particular embodiment of the method includes distributing a software platform to a first enterprise and distributing the software platform to a second enterprise. The software platform is for use in connection with an enterprise computing system having a plurality of backend software applications. The software platform includes a data modeling program allowing creation of a data model associated with at least one of the plurality of backend applications. The software platform further includes a deployment feature allowing deployment of at least a portion of the data model to a plurality of mobile computing devices.

In accordance with a further embodiment, the method includes integrating a first computing system into a first enterprise network and integrating a second computing system to a second enterprise. The first computing system comprises an integration unit operable to access a backend application of the first enterprise network, and a connection unit responsive to a plurality of mobile computing devices. The integration engine is further operable to access a first data model that references at least one enterprise object associated with the backend software application. At least one of the plurality of mobile computing devices has access to the first data model.

In accordance with a further embodiment, the method includes distributing the software platform to an enterprise having an enterprise software system. In this embodiment, the software platform comprises a software tool for creating a mobile data model, an integration module responsive to the enterprise software system, and a connection module responsive to a plurality of mobile computing devices. The integration module has access to the mobile data model, and the mobile data model is associated with data from the enterprise software system.

In accordance with a further embodiment, the method includes distributing to a first enterprise a software platform and distributing to a second enterprise a second version of the software platform. The software platform comprises data modeling code for creating a data model that models both enterprise backend application objects; and mobility deployment code for deploying at least a portion of the data model to a mobile computing device.

In accordance with a further embodiment, the method includes the steps of identifying a provider of a software platform and receiving the software platform. The software platform comprises data modeling code for creating a data model that models both enterprise backend application objects and mobility deployment code for deploying at least a portion of the data model to a mobile computing device.

In accordance with a further particular embodiment, the method includes the steps of: receiving a software platform and hosting the software platform. The software platform comprises data modeling code for creating a data model that models enterprise backend application objects and mobility deployment code for deploying at least a portion of the data model to a mobile computing device.

DETAILED DESCRIPTION OF THE DRAWINGS

Figure 1:
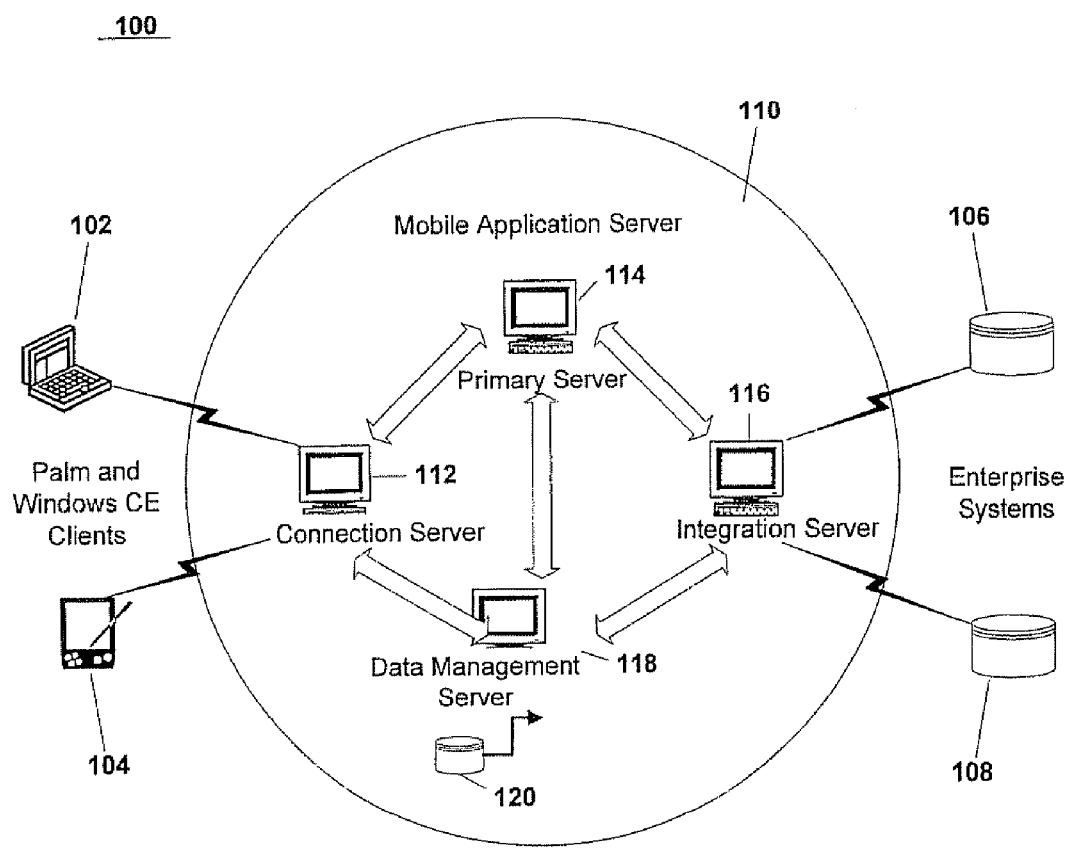
FIG. 1 depicts a block diagram of one embodiment of a system incorporating teachings of the present invention.

Referring to FIG. 1, a system 100 is depicted. As depicted, system 100 includes enterprise systems 106, 108, a mobile application server network 110, and a plurality of mobile computing devices, such as devices 102 and 104. Devices 102, 104 may include, for example, personal digital assistants ("PDA's"), wireless telephones, and wireless thin-client terminals. The enterprise systems 106, 108 may include, for example, a plurality of different back-end end application systems, which may include accounting systems, transaction systems, databases, enterprise resource programs and other enterprise computing infrastructure.

The mobile application server network 110 of FIG. 1 may include an integration server 116, primary server 114, data management server 118, and connection server 112. A server may include, for example, computer operations running in separate computing platforms or the same computing platforms. The computer operations may be written to be object-oriented and may make use of different languages including, for example, third generation languages like Java, C++, and PL/S. As shown, data management server 118 may execute code that allows it to couple to a data store 120. As depicted, a domain data store 120 may contain a subset of enterprise information stored, for example, on a single hard drive, an array of disks, a storage area network, or a combination thereof. In operation, integration server 116 may be responsive to and in communication with the enterprise systems 106, 108. The integration server 116 may also handle transaction data and information flow in communication with the enterprise systems 106, 108. Connection server 112 may be communicatively coupled to the mobile computing devices 102, 104 and may be capable of deploying mobile applications and a common mobile data model to the mobile computing devices 102, 104. In addition, the connection server 112 may receive stored transactions from the mobile computing devices 102, 104, where such stored transactions were created while the mobile computing devices 102, 104 were detached from the connection server 112. Data management server 118 of FIG. 1 may be coupled via communication links to both connection server 112 and integration server 116. Primary server 114 may be coupled to connection server 112, integration server 116, and data management server 118.

In operation, system 100 allows back-end end applications within the enterprise systems 106, 108, to be extended to a plurality of different mobile computing devices 102, 104, via a mobile application server 110. The mobile application server 110 preferably allows the mobile computing devices 102, 104, to operate on a stand-alone basis. For example, mobile devices 102, 104 may include selected applications and data to be able to perform stand alone applications while such devices are not connected with server 112. In this manner, the mobile computing devices 102, 104, allow mobile workforce users to have further flexibility and to perform useful functions without being tethered via inconsistent and unreliable connections to the back-end server or the back-end enterprise system 106, 108.

Figure 2:
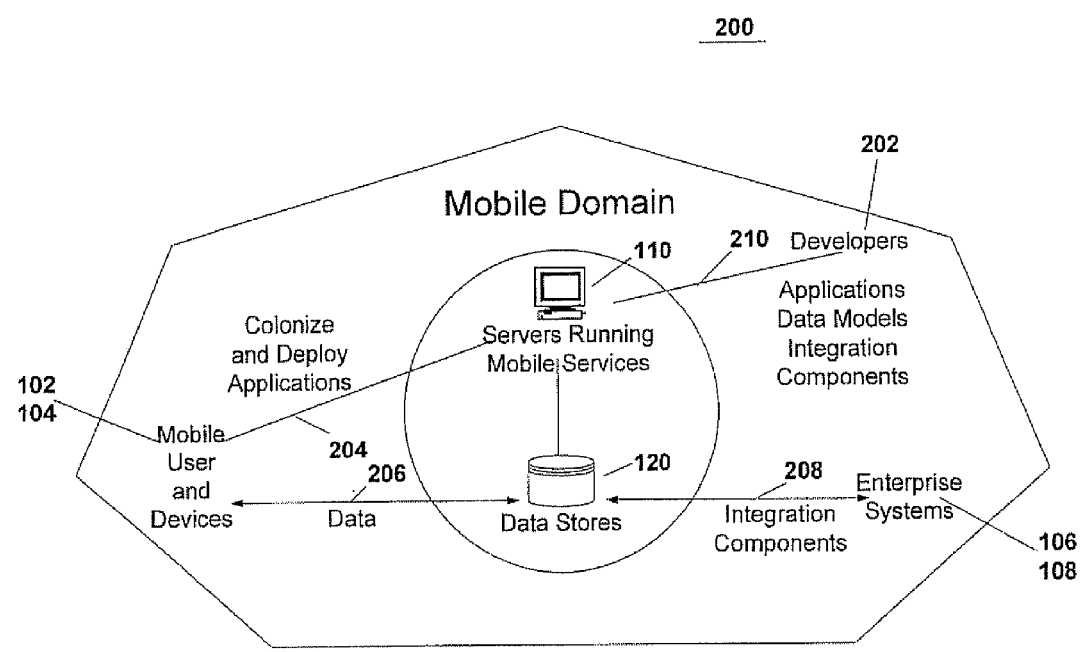
FIG. 2 depicts a general diagram of one embodiment of a mobile domain that incorporates teachings of the present invention.

Referring to FIG. 2, one embodiment of a mobile domain 200 incorporating teachings of the present invention is depicted. Mobile domain 200 includes interfaces to the enterprise systems 106, 108, to the mobile users and devices 102, 104, to the global application servers 110, and domain data store 120, all as illustrated in connection with system 100 of FIG. 1. The mobile domain 200 may allow developers 202 to build applications, data models, and integration components 210 using application server 110. A data model may be embodied by computer operations and may identify data objects or enterprise objects that are used in business or other contexts and defines the relationships among these objects.

The mobile application server 110, via the mobile domain 200, may then colonize and deploy applications 204 to the mobile users 102, 104. In addition, data from the mobile devices 102, 104, may be communicated at 206 and then stored in domain data store 120. Data from the data store 120, as part of a transaction, may be packaged and then delivered via integration components 208 to the applicable enterprise system and back-end application 106, 108.

Within mobile domain 200, developers 202 may possess the ability to create mobile computing applications with data models and integration components that allow extension of enterprise system software to a variety of mobile devices with ease and flexibility. In addition, with mobile application server 110 and data store 120, various transactions and accompanying data from the mobile computing devices 102, 104 may be managed and appropriately interconnected with the back-end enterprise systems 106, 108. Such operations may occur despite a lack of a persistent wireless connection between mobile computing devices 102, 104 and mobile application server 110 through updating events between mobile application server 110 and mobile computing devices 102, 104. Such updating events may comprise, for example, mobile application server establishing a wireless connection, and then transferring data 206 between a mobile data store and domain data store 120. Domain data store 120 may also update with back end applications on enterprise systems 106, 108, and the domain data store updates may occur at various times and, as such, avoid a technical difficulty associated with conventional data synch systems. Convention data synch systems often see a mass of users synching at or around one time (e.g., 8:00 am) at the beginning of a work day and again at or around another time (e.g., 5:00 pm) at the end of the work day. This twice a day peaking, which can overtask enterprise backends, may be avoided by allowing domain data store 120 to update throughout the day and at least partially self-support the updating of mobile computing devices 102, 104. The architecture of mobile domain 200 may allow users to wirelessly access and modify data from back-end applications without a persistent wireless connection.

Figure 3:
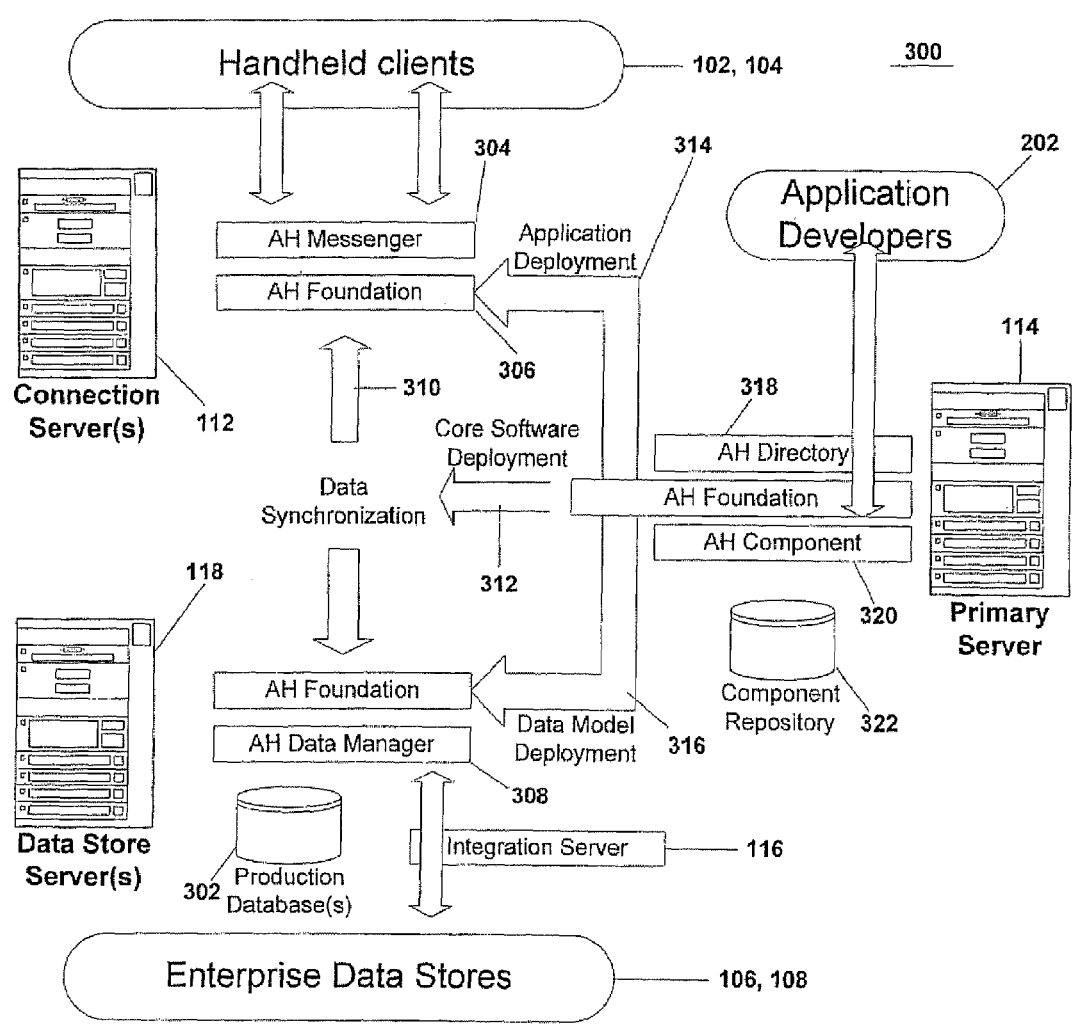
FIG. 3 depicts a general diagram further illustrating certain portions of the embodiment depicted in FIG. 1.

Referring to FIG. 3, a system 300 is depicted. System 300 is a more detailed illustration of a portion of system 100 depicted in FIG. 1. System 300 includes hand held clients, such as mobile computing devices 102, 104, enterprise data stores, and may allow for application developers 202. The system 300 also includes connection server 112, data store server 118, integration server 116, and primary server 114. Application developers 202 may interface with the primary server 114 via the mobile directory 318, the mobile component layer 320, and the foundation layer 312. The software components 320 may be stored temporarily in component repository 322. Application developers 202 may create applications that interact with a mobile data model referencing enterprise data. These applications may be distributed within the system 300. For example, in operation, applications designed for hand held clients may be distributed to the foundation layer 306 through a messenger layer 304 and then deployed to hand held clients 102, 104. The deployment may occur across a persistent or a non-persistent wireless link employing various types of wireless protocols (e.g., SMS, cellular, etc.). The mobile data model may be accessed so as to allow applications effective access to enterprise data stores 106, 108. Transaction data from the hand held clients 104, 106 received via the mobile messenger and passed through the foundation layer 306 is synchronized via data synchronization functionality 310 to the foundation layer 306 and data manager 308. Such transactions, via integration components 208, are propagated by integration server 116 to the enterprise data stores 106, 108.

As a further example, core software developed by application developers 202 may be deployed via the foundation layer 306 to the data synchronization functionality, as illustrated by core software deployment action 312. Thus, the detailed implementation illustrated with system 300 describes software layers that may be utilized to extend enterprise object data and functionality from enterprise data stores and other enterprise computing infrastructure for distribution to hand held clients. In addition, the system 300 allows transmission of transactions through a variety of global application servers for improved communications with enterprise back-end applications.

Figure 4:
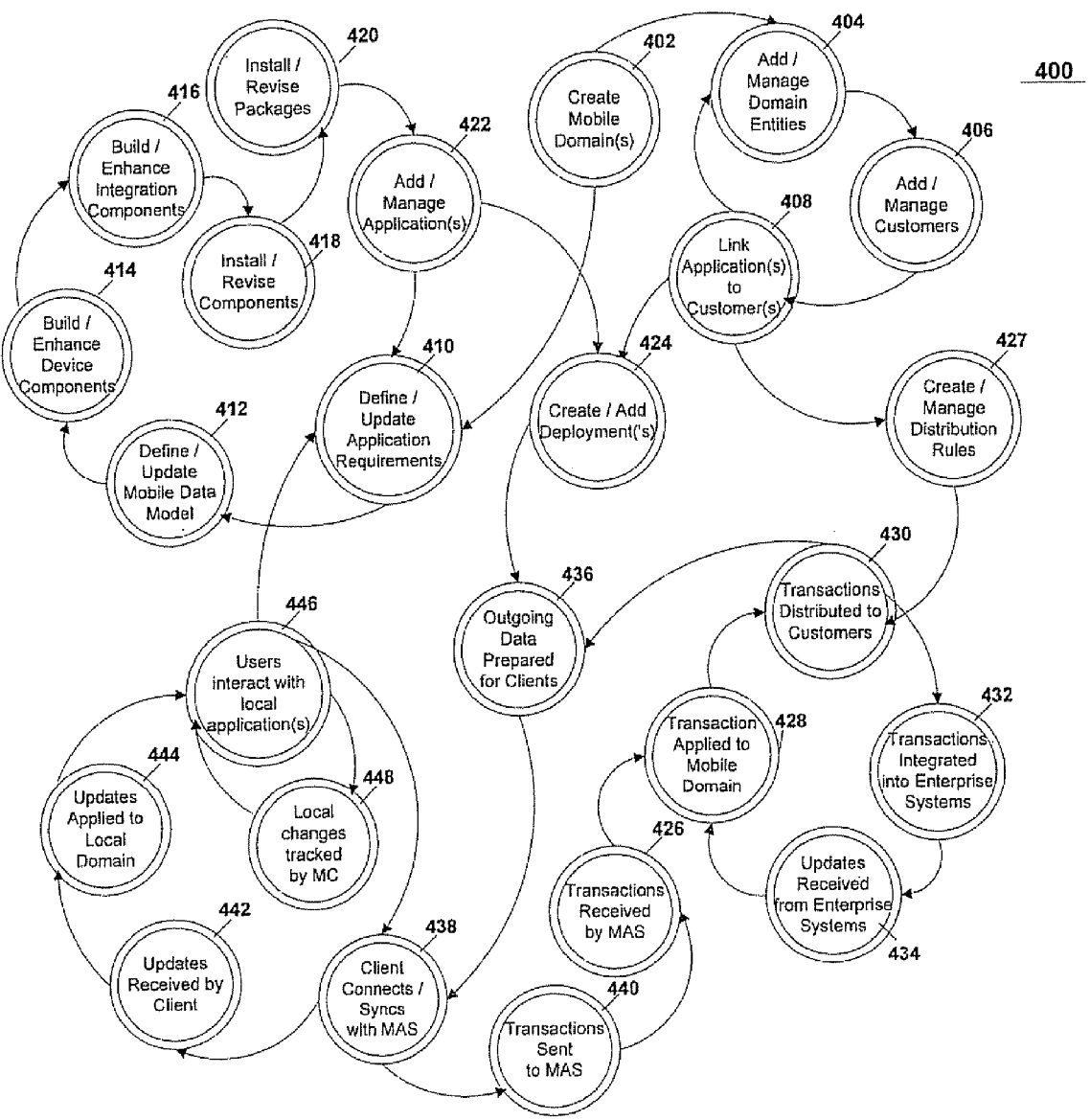
FIG. 4 shows a state transition diagram that illustrates operation and use of the embodiment depicted in FIG. 1.

Referring to FIG. 4, a state transition diagram 400 is depicted. State transition diagram 400 illustrates one embodiment of the operation of system 100, depicted in FIG. 1. State transition diagram 400 illustrates exemplary operations that may be performed using the mobile application server within the system 100.

An initial step in the mobile application process may be the setup and configuration of a mobile domain, step 402. The mobile domain is preferably a flexible environment, supported by the mobile computing system, which provides the fundamental basis for the entire mobile application process.

In operation, the mobile domain manages and provides services for various type of system instances that make up the constituent population of the domain. Examples of system instances types are users, groups, servers, data stores, and devices. The mobile domain manages and provides services for the various types of software instances that collectively make up the machinery or automation of the domain. Examples of software instance types are applications, components, and packages.

The mobile domain may manage the various classes of information or data instances that collectively make up the content of the domain, as required by applications which have been deployed to the domain. These instances encompass the runtime data of the domain which is accessed and distributed to consumers, persisted in domain data stores, presented to mobile users, and exchanged with enterprise systems.

Entities of the mobile domain, whether system, software, or information instances, may be managed (either directly or indirectly) using the graphical user-interface provided by the mobile computing system, at 404. At the beginning of the mobile application process, the system administrator may add particular entities to the mobile domain, based on the initial requirements of the enterprise applications they are attempting to extend. As the mobile domain evolves, the administrator manages the entities by modifying ones that currently exist, adding more, or removing ones that are no longer necessary.

At 406, consumers may be added and managed. In some embodiments, the activities in the mobile domain may be driven by system instances referred to as consumers. A consumer in the mobile domain may be an entity that accepts an assigned application managed by the domain, has components of the application deployed to it, and has its components updated when changes occur. In operation, a consumer may be linked to data instances managed by a domain, may receive these instances and may have transactions based on these instances re-distributed as rules in the system dictate.

Further, a consumer may access, create, and update data instances managed by the domain, and may have relevant transactions based on these instances re-distributed to other interested consumers in the domain (as rules in the system dictate). In some cases, a set of consumers may be established such that the set is treated collectively as an individual consumer.

Consumers may take many forms. For example, a consumer may be a single user or group of users. A single user may typically be an individual mobile worker that is assigned one or more domain applications in order to perform that individual's required job functions. When the consumer is an individual worker, data instances may be linked to and distributed to the consumer in order to populate the applications that enable that worker's job role.

Similarly, a group of users may be treated collectively as a single consumer, with each user in the group sharing some set of assigned privileges. In practice, users may be collected into groups so that they may share domain resources based on real-world affiliations, such as geographic location or job role.

Another consumer type may be specific software instances that are not deployed to consumers in the domain, but to other entities of the domain, such as data stores. An example of this type of consumer is an integration component. These components may access, create, and update data instances in the domain directly while interfacing with one or more enterprise systems.

Preferably, the consumers of a mobile domain may be managed using the graphical user-interface provided by the mobile computing system. At the beginning of the mobile application process, a system administrator may add consumers to the mobile domain. As the mobile domain evolves, the administrator may manage the consumers by adding more, modifying ones that currently exist, or removing ones that are no longer necessary.

Before a consumer interacts with the mobile domain, the consumer may be linked, at 408, to applications that they can use on their mobile computing devices, and have those applications deployed to them. Each application may be a software instance that can be created, deployed and updated by developers that interface with the mobile domain. Preferably, an application may be managed using the graphical user-interface provided by the mobile computing system in the context of managing consumers. This interface may be used to link applications to new consumers and unlink applications from consumers, as required for the consistent operation of the mobile computing system. Once an application is linked to one or more consumers, changes to that application, including new deployments and updates, can be distributed to the consumer.

In practice, before software instances are designed and developed, operational requirements or guidelines may need to be established. For example, at 410, guidelines may be established that articulate the goals specific to extending the usage and availability of one or more enterprise application systems. The development of these requirements may be an initial step in the mobile application process. A key advantage of the mobile application process is that it allows developers to focus on implementing these requirements in software form, rather than wasting time on the details of implementing the mechanics of the lower-level mobile computing system. This ease of use may be partially provided by an appropriate mobile data model.

A mobile data model may be defined and updated, at step 412. The basis for the management of information instances in the mobile domain, as well as the development of software instances that access that information is one or more mobile data models. The classic definition of a data model was that it defined the physical schema or structure of a persistent data store (e.g., relational database). A mobile data model extends this definition in several ways. For example, a mobile data model may define not only a physical view of data, but also simultaneously an object-oriented and logical view. This may provide a preferred access interface for applications. In addition, a mobile data model may be decoupled from particular storage, distribution, access mechanism, or platform, allowing its use across a variety of back-end systems and device computing platforms. A mobile data model will preferably describe transactions and define connections between individual data classes, expressing relationship and dependency relationships, to streamline access to data by applications. A mobile data model may also contain embedded distribution attributes, which form the basis for effective dissemination of data instances to interested consumers.

Once requirements for the mobile application are defined, a developer may build an initial mobile data model to reflect these requirements. The mobile data model may be built using tools provided with the mobile computing system. As application requirements change, the developer may return to the mobile data model to update it as needed.

Once a mobile data model has been built, the developer can build one or more software program components that will operate on the server side of the mobile computing system in order to integrate the mobile computing system with one or more enterprise back-end applications, at step 416. These components, or software instances, may be built using a variety of programming languages, depending on the systems in question. These components may facilitate the transfer of data to and from enterprise systems as application requirements dictate. Each integration component may access application programming interfaces (APIs) provided by the mobile computing system in order to access a desired information instances. As application requirements change, the developer may enhance the integration components as needed.

A mobile data model, one or more device software programs, and one or more integration software programs may be introduced or installed, at step 418, into the mobile domain as software instances called components. Individual components may be installed to the domain using tools provided by the mobile computing system, then managed automatically by that system. Once installed to the mobile domain, each component instance may be versioned and stored, available for access by any authorized entity of the domain or service of the computing system. Individual components are not necessarily deployed at the time they are installed to the mobile domain. They may be added to one or more package instances first. Components may be first introduced to the domain through a process referred to as installation. As application requirements change, and components are updated or enhanced, the software instances in the domain which represent the components may be revised as needed.

The process of mobile application deployment may begin after components have been installed to the mobile domain. At this time, the components may be combined together into software sets referred to as packages, at 420. Packages may include software instances that are installed to the mobile domain using tools provided by the mobile computing system and managed by the system. Once installed, a package instance may be configured through the addition and modification of sub-instances known as targets. The target may indirectly represent an individual system instance in the mobile domain that will receive components of the package once it has been deployed by an application instance. In operation, a component my be added to a package on behalf of the target that will receive it.

For example, a package target may be a data store in the mobile domain. When a data store target is added to a package, it may at that time be linked to a specific version of a mobile data model component instance, which may then be added to the current version of the package instance. Upon deployment of the package instance, the mobile data model component is deployed to the data store, causing the mobile computing system to create or update physical database tables in the database managed by the data store instance.

Another example may include integration components. Individual integration component instances may be added to a package, on behalf of a data store target. These integration components may then be deployed to the data store, to be installed and managed by the mobile computing system.

Another example of a package target is a device in the mobile domain. Once a device target is added to the package, individual device component instances can be added to the package on behalf of the device target. These device components may then be deployed to the device, to be installed and managed by the mobile computing system. When a package is introduced to the domain, the process is called installation. As application requirements change, components are updated or enhanced, and package targets may need to be updated. The software instance in the domain that represents the package may be revised as needed.

In a particular embodiment of a system incorporating teachings of the present disclosure, there may be three types of software instances within a mobile domain: components, packages, and applications. As described in previous steps, individual component instances may be the first to be installed to the mobile domain, then packages may be created, which link together versions of these components. At this point, however, the instances may only capture the intent of a potential deployment. To commit to this intent and activate the various software programs included in a package, a version of that package may be deployed to the mobile domain, and then to consumers within the domain. Consumers, however, may not be linked to the package directly. They may, for example, be linked to an alias, called an application. This abstraction may insulate the administrator, and the consumers, from the development details of components, packages, and targets, and instead allow a single point of association for a set of business functionality within the mobile domain. The application instance may manage individual deployment instances, each of which encapsulates a particular package version, a set of component versions, and a set of targets, each linked to a particular system instance destination (e.g., device or data store). Consumers may be linked directly to these by association with the application instance.

Applications may be added to the mobile domain, at 422, using the graphical user-interface provided by the mobile computing system. Consumers may be linked directly to the application instance using this same interface.

As initial or revised versions of application functionality are developed, and components and packages are installed or revised in the mobile domain, this functionality may be released to Consumers through the process of deployment, at step 424. It is through deployment that static software instances like package and components actually take on "life" within the context of an application. Using the graphical user-interface provided by the mobile computing system, the administrator may create deployment instances that are managed by the application. Each deployment is considered an instantiation of a particular package version. Once the package is selected, the deployment is configured based on the specific targets specified in the package. Each target is linked to a specific system instance, called a destination, within the domain, to which the components of the target will then be deployed. The deployment is scheduled for release, either immediately or sometime in the future. Upon release, the mobile computing system deploys to the mobile domain, applying components to master instances of data stores and devices, and then to individual consumers linked to the deployment's application instance.

Ultimately, the mobile worker interacts with the mobile domain by using one or more applications that are installed on their mobile computing device. These local applications may interface directly with a small portion of the mobile computing system that is also installed on the device. The local mobile computing system may be responsible for managing a subset of the mobile domain which is resident on the device, as well as installing and managing itself and the applications which have been deployed to the user identity assumed by the mobile worker.

In order to interact initially with the mobile domain, a mobile worker may download a small software "bootstrap" program from the mobile computing system onto their mobile computing device. This program may be referred to as the colonist. The colonist may be made available to the mobile worker through a variety of means, including website, file server, email, etc . . . After the download, the mobile worker may execute the colonist, which will then ask the worker to identify himself/herself using a set of predefined credentials. These credentials may be determined when the worker is first added to the mobile domain as a User, see step 406. Once the worker has provided a proper local login, the colonist may connect to the server-based mobile computing system (using one of a variety of communications media) to authenticate that the proper credentials were indeed provided. If properly authenticated, the colonist may then establish a full connectivity session with the server-based mobile computing system, at step 438.

Once the mobile application (and mobile computing system) have been installed locally, at step 438, the mobile worker may periodically synchronize the local domain with the server-based mobile domain. This may be accomplished, for example, by directly accessing the user-interface presented by the local computing system (called the mobile client) or by accessing functionality in the device application which in turn accesses functionality in the mobile client via its APIs. At this point, the mobile client may attempt to connect to the server-based mobile computing system (using one of a variety of communications media) and authenticate that the current User has current access privileges. If properly authenticated, the mobile client may establish a full connectivity session with the server-based mobile computing system.

When a connectivity session has been established between a device's mobile client and the server-based mobile computing system, a synchronization process may occur, allowing the mobile client to send up any completed transactions that have been queued since the last synchronization session, at 440. These transactions may contain one or more data operations that have previously been applied to the local data store, but need to be communicated to the server-based data store. The transactions may be packed into optimized files (compressed and encrypted) that can be transmitted over a variety of communications media. Upon reception, these transactions may be processed by the server-based mobile computing system. In some cases, this step may not be performed, (e.g., if a user elects to skip this step when a mobile device is first being colonized).

After server-pending transactions have been sent to the server-based mobile domain, the mobile client may receive or download updates, at 442, that have been prepared for the user by the server-based mobile computing system since the last synchronization session. In some cases, updates may not be sent until the mobile client has completed communication of its queued transactions. When sent, updates may include a variety of changes, including data transactions, application updates, and updates to the local mobile computing system. These updates may be available to the mobile client as size reduced files (compressed and encrypted) that can be transmitted over a variety of communications media. Each of the available update files may first be downloaded to the mobile device, then applied to the local domain.

After the updates have been received from the server-based mobile computing system, the local mobile client may process them, at 444. These updates may be handled in the following ways, according to their type. Mobile client deployments, when received, may be applied directly to the local mobile computing system. If the mobile device is currently being colonized, the update will likely contain an entire new installation of the local mobile computing services. If a mobile client deployment is received during normal synchronization, the updates may be installed to improve or enhance the core services provided by the local mobile computing system.

Application deployments, when received, may be applied to local device applications that the mobile worker is using. If the mobile device is currently being colonized, the update will likely contain an entire new installation of one or more application components. If an application deployment is received during normal synchronization, updated components may be installed to improve or enhance the user-interface or business automation presented to the mobile worker.

Data store deployments, when received, may be applied to one or more of the data stores in the local domain. If the mobile device is currently being colonized, the update will likely contain an entirely new mobile data model that is used to build a new local database. If a data store deployment is received during normal synchronization, an updated data model may be used to alter the structure of the local database (as required). Data transactions, when received, may contain data operations (inserts, updates, deletes) that need to be applied to one or more of the local data stores.

Once the mobile application (and mobile computing system) has been installed locally, the mobile worker may interact with the user-interface and functionality presented by the device program components. To adequately present the proper experience for the mobile worker, the device software programs may access various services from the mobile client, including accessing, creating, and updating data from the local domain, and connecting with the server-based mobile computing system.

As the mobile worker interacts with the local applications, the underlying device software components may access data from the local domain data stores using services presented by the local mobile client. As the device software components create new data instances, update existing instances, or delete unneeded instances, the mobile client may track these changes as transactions, at 448. Upon the next synchronization session, these transactions may be sent to the server, at 440.

During normal synchronization sessions by the mobile client, pending transactions may be sent or uploaded from the local mobile computing system to the server-based mobile computing system, at 426. These transactions are received by the server-based system and prepared for processing. Transactions can also be received by the mobile computing system during deployments.

When transactions are received by the server-based mobile computing system, they may be processed according to the following process: data transactions, when received, may contain data operations (inserts, updates, deletes) that need to be applied to one or more of the data stores contained within the server-based mobile domain, at step 428. These transactions may be applied directly to the data store, then sent to the rules-processing engine to be distributed to consumers in the mobile domain that might be "interested", at 430. Data store deployments, when received, may be applied to one or more of the data stores in the server-based mobile domain. If the data store is uninitialized, the deployment will likely contain an entirely new mobile data model that is used to build a new server-based database. If a data store deployment is received for an already-deployed data store, the updated data model may be used to alter the structure of the database (as required).

Application deployments, when received, may be applied to the destination instances specified by the Deployment configuration. Deployments to device targets will often contain device-based software components that will ultimately be prepared for download by individual mobile clients. Application deployments to data store targets will often contain integration software components that will be installed on the server in order to link to enterprise application systems.

At step 430, once data transactions are applied to server-based data stores, they may be additionally processed by the server-based mobile computing system in order to determine if any consumers within the mobile domain might also need to be informed about the data operations contained therein. This processing is handled by a special rules engine within the server-based mobile computing system. This rules engine may be driven by special conditional logic statements developed by the administrator of the system.

After data transactions are applied to server-based data stores, they may also be offered to integration components that are currently deployed so that the transactions can also be integrated into one or more enterprise back-end application systems (as dictated by requirements of the mobile application), at step 432.

In some systems, while data transactions are being integrated into one or more enterprise application systems, integration components may also receive updates from these systems which are then applied to the mobile domain, at step 434.

During ongoing processing by the server-based mobile computing system, changes that have been applied to the mobile domain that also affect one or more consumers may be packaged into updates which are then pending for download by mobile clients, at 436.

Special conditional logic statements which drive the rules engine in the server-based mobile computing system may be created by the system administrator using the graphical user-interface provided by the mobile computing system, at step 427. These rules may control how data that is applied to the server-based mobile domain is distributed to other consumers in the domain. Thus, FIG. 4 has illustrated the operation and use of a particular embodiment of mobile domain that may be incorporated into a distributable software platform.

Figure 5:
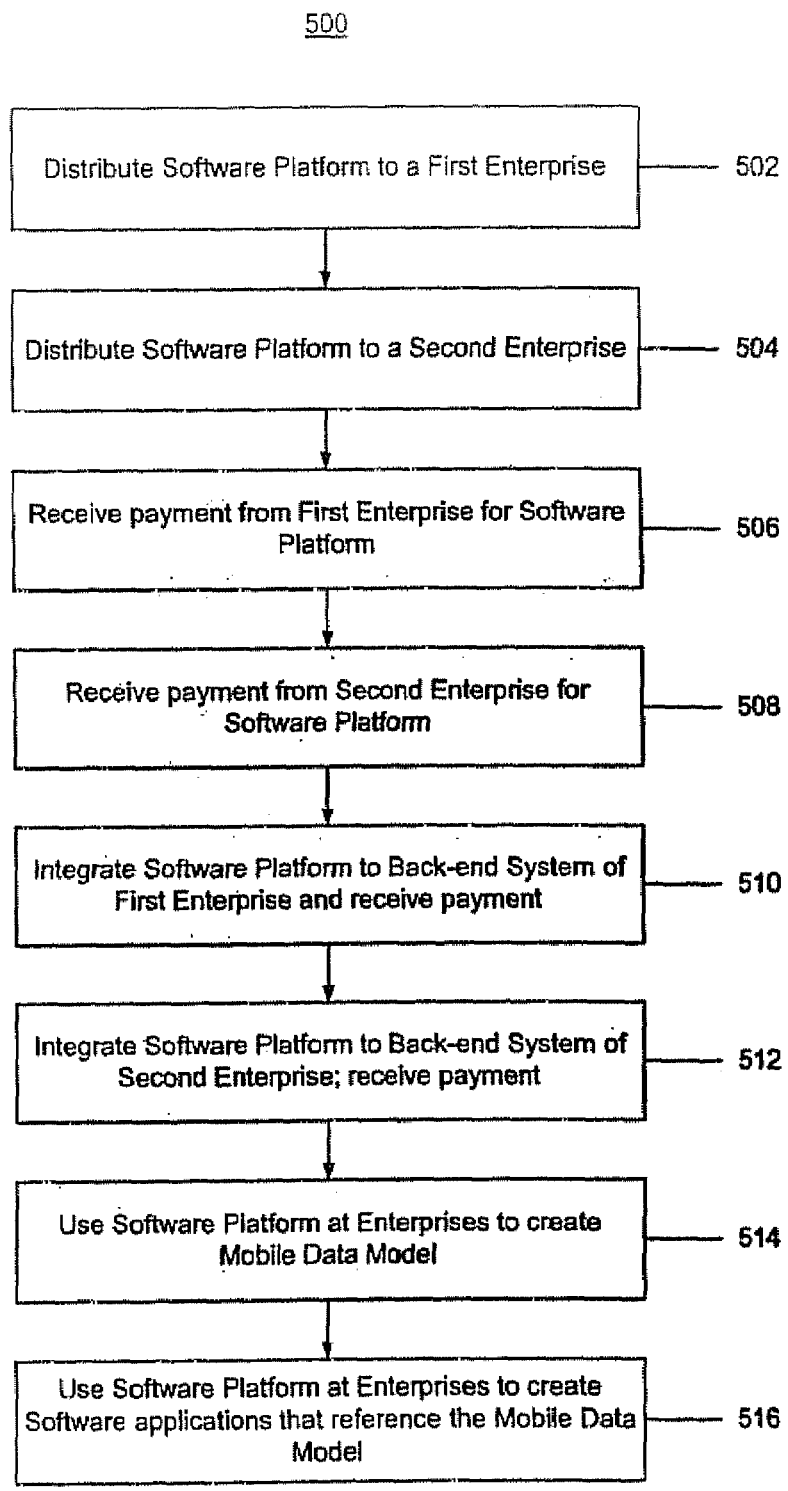
FIG. 5 is a flow chart that illustrates an embodiment of a software platform distribution method.

Referring to FIG. 5, a flow chart 500 of a method of distributing a software platform to multiple enterprises is illustrated. At 502, the software platform is distributed to a first enterprise. The software platform is distributed to a second enterprise, at 504. Payment is received for the software platform from the first enterprise, at 506, and from the second enterprise, at 508. The software platform is integrated to backend systems of the first enterprise and payment is received for such integration, at 510. Similarly, the software platform is integrated to backend systems at the second enterprise and payment is received for integration from the second enterprise at 512. The software platform is then used at the enterprises to create a mobile data model, at 514, and to build software applications that reference the mobile data model, at 516. While the illustrative method described with respect to FIG. 5 describes two enterprises, it should be understood that the software platform may be distributed, integrated, and used by many enterprises.

Figure 6:
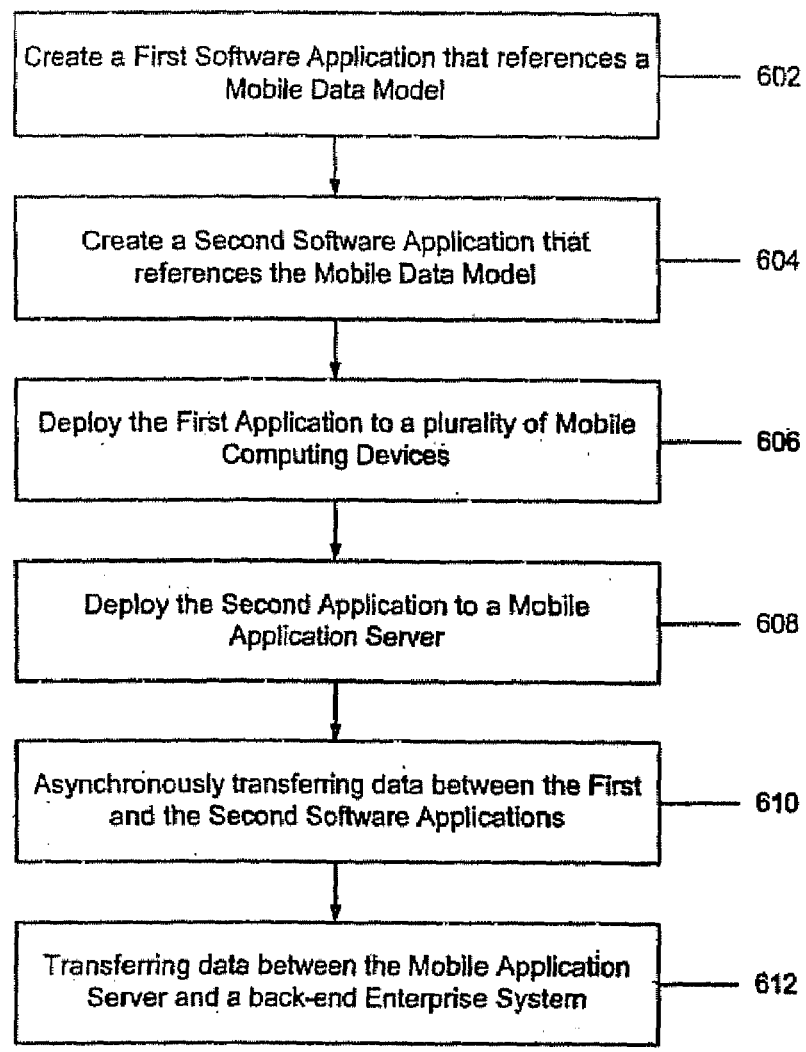
FIG. 6 is a flow chart that illustrates an embodiment of a method of deploying a software application that references a mobile data model.

Referring to FIG. 6, a method 600 of creating and deployment software applications that reference a mobile data model is illustrated. A first software application that references a mobile data model is created, at 602. A second software application that references the mobile data model is created, at 604. The first software application is deployed to a plurality of mobile computing devices, at 606, and the second software application is deployed to a mobile application server, at 608. Data is asynchronously transferred between the first software application and the second software application, at 610. For example, transaction data from a mobile computer devices may be sent to the mobile application server, or data from an enterprise backend application may be delivered to a mobile computing device for use by a mobile worker. Data is transferred between the mobile application server and a backend enterprise system, at 612.

Figure 7:
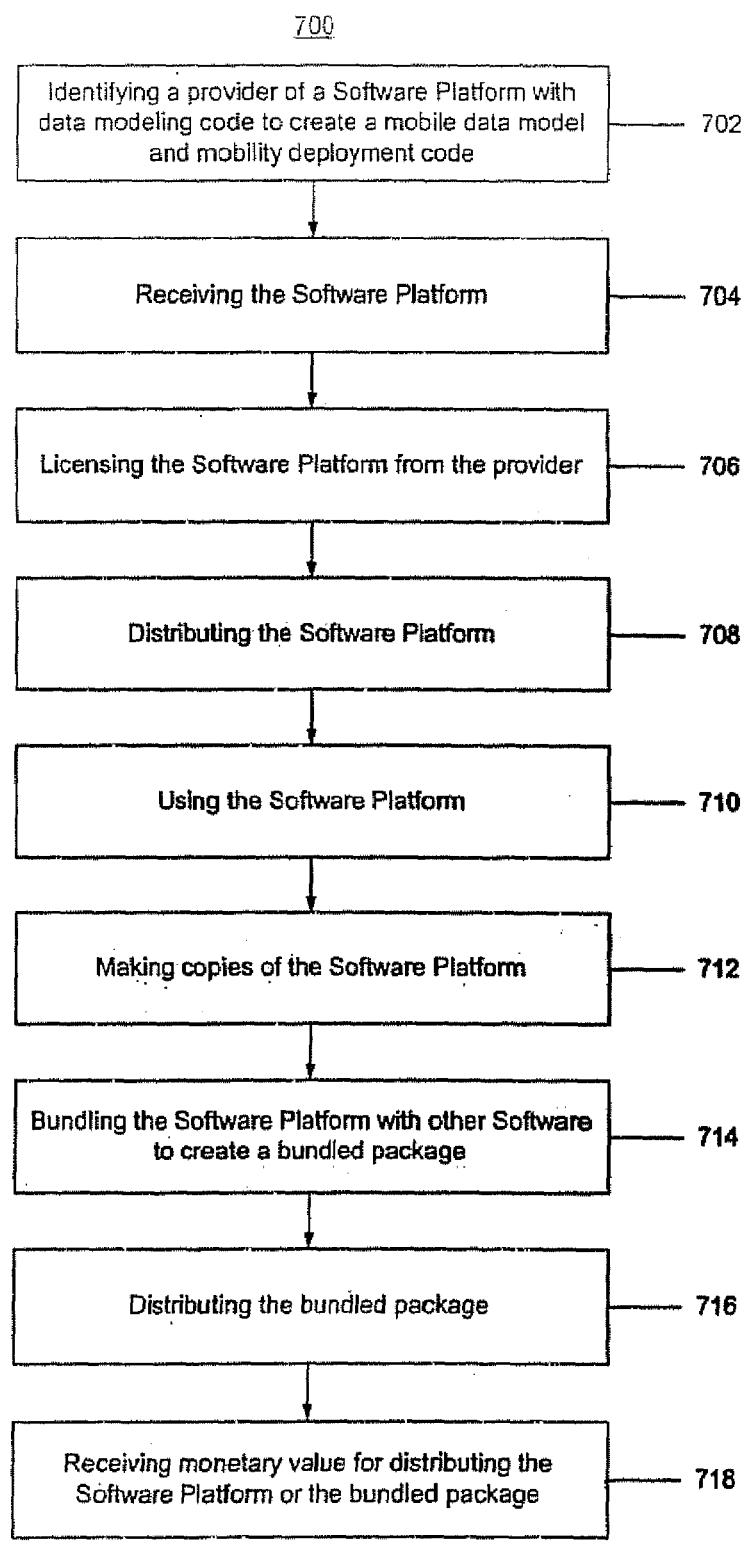
FIG. 7 is a flow chart that illustrates an embodiment of a method of receiving, licensing, and re-selling a software platform, or creating and selling a bundled package that includes the software platform.

Referring to FIG. 7, an illustrative method 700 of reselling a software platform is disclosed. At 702, a provider of a software platform is identified. The software platform includes data modeling code to create a mobile data model and mobility deployment code. The software platform is received, at 704, and is licensed from the software provider, at 706. The software platform is distributed, at 708, and then used, at 710. Copies of the software platform may be made, at 712. The software platform may be bundled with other software to create a bundled package, at 714. The bundled package is distributed at 716. Monetary value is received for distributing the software platform or for the bundled package, at 718.

Figure 8:
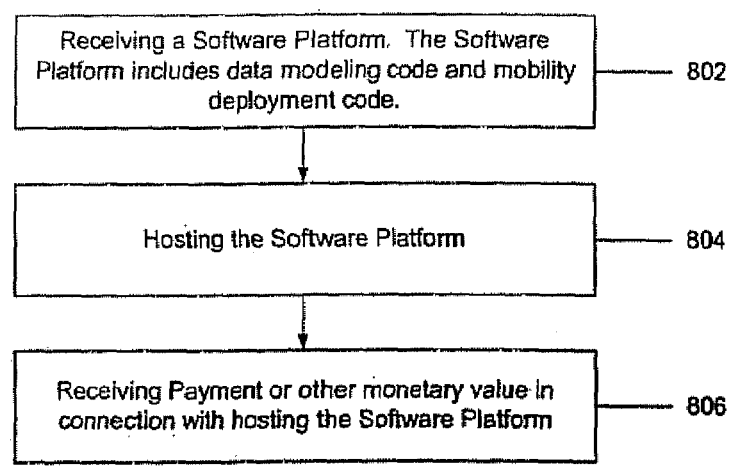
FIG. 8 is a flow chart that illustrates an embodiment of a method of hosting the software platform.

Referring to FIG. 8, a method of hosting 800 is disclosed. The method includes the step of receiving a software platform, at 802. The software platform includes data modeling code and mobility deployment code. The software platform is hosted at 804. Typically, hosting involves loading the software platform onto a server that is connected with a computer network, such as the internet or an intranet, so that multiple users may access the software platform. Hosting may also include hosting services that accompany the hosting process. Payment, or other type of monetary value, for hosting the software platform is received at 806.

Figure 9:
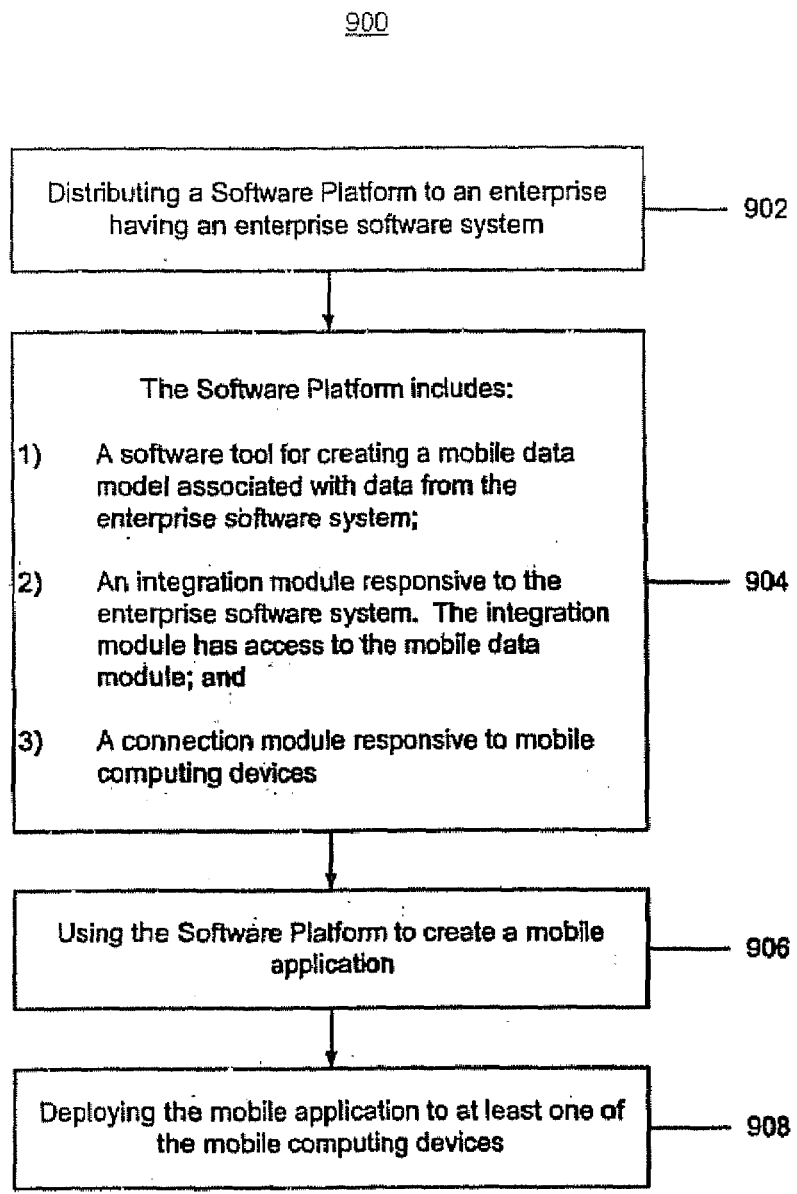
FIG. 9 is a flow chart that illustrates an embodiment of a method of distributing and using the software platform.

Referring to FIG. 9, an illustrative method of distributing a software platform is disclosed. With this method, a software platform is distributed to an enterprise having an enterprise software system, at 902. The enterprise software system may be any of the various back-end types of software and accompanying computing hardware used by enterprises. The software platform in this particular embodiment includes a software tool, an integration module, and a connection module. The software tool is for creating a mobile data model associated with data at the enterprise software system. The integration module is responsive to the enterprise software system. The integration module also has access to the mobile data model. The connection module is responsive to mobile computer devices. The software platform may be used to create mobile software applications for the mobile computer devices, at 906. Also, the mobile applications may be deployed to one or more mobile computer devices, at 908.

Figure 10:
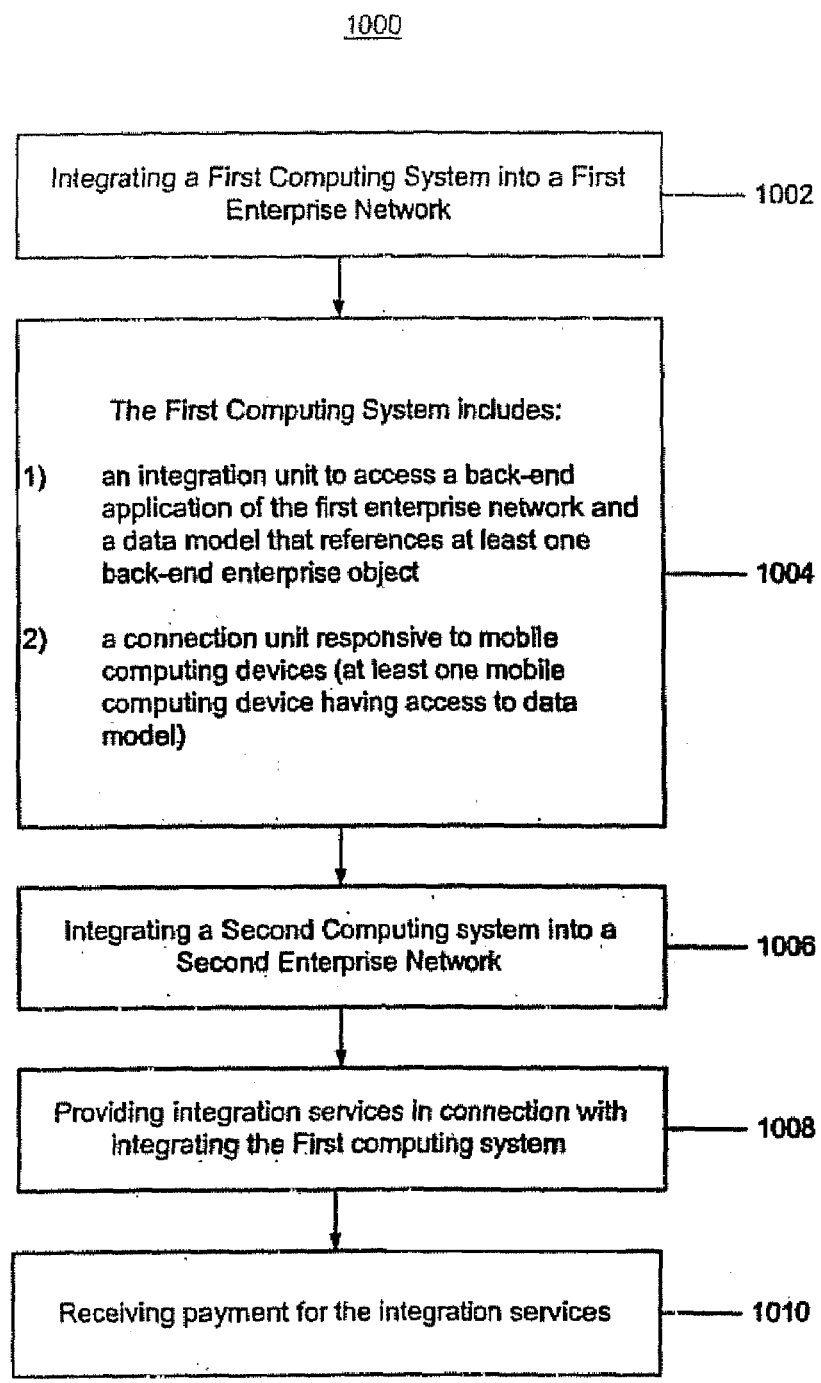
FIG. 10 is a flow chart that illustrates an embodiment of an integration method.

Referring to FIG. 10, a particular illustrative example of an integration method is shown. With this method, a first computing system is integrated into a first enterprise network, at 1002. The first computing system includes an integration unit and a connection unit. The integration unit is to access at least one back-end application of the first enterprise network and to access a data model that references at least on back-end enterprise object. The connection unit is responsive to mobile computing devices. At least one of the mobile computing devices has access to the data model. A second computing system is integrated into a second enterprise network, at 1006. Integration services may also be provided in connection with integrating the first computing system or the second computing system, at 1008. Payment, or other value, is received for providing the integration, or the integration services, at 1010. Integration of the first and second computing systems allows the enterprise network applications and object to be modeled and then used by mobile computing devices. In this manner, mobile workers can use mobile computing devices to interact with enterprise back-end systems.

An example of a mobile data model is illustrated below:

A system incorporating teachings of the present disclosure may extend an enterprise information system out to a mobile workforce and may involve the steps of building a mobile data model, writing an integration component, and writing a mobile application. When operational, the system may shepherd data from the enterprise information system out to the mobile workforce where it can be used in mission critical operations and then shepherd data back to the enterprise. The diversity of systems found at either end of this traversal can make this task difficult to accomplish.

A typical enterprise information system may, for example, have diverse aggregations of hardware, software, and operating systems. Such a system may span multiple platforms, be purchased from different vendors, display dates of manufacture from different technology eras, and may be running a disparate collection of unique proprietary systems.

At the other end of the data traversal, the mobile workforce may, today, choose from a wide array of inexpensive handheld devices. For example, handheld devices may include laptops, palm sized computing platforms, scanning guns, and others. Each of the devices may have different screen sizes, processor types, and operating systems.

A mobile domain system may also include a mobile data modeler, which could be a software engine or collection of code, that enables development of a mobile data model. In one embodiment, the developed mobile data model may represent a subset of enterprise information and may be used throughout the mobile domain system.

As discussed above, a user may build a mobile data model, write an integration component, and write a mobile application. The modeling process may involve determining which subset of enterprise data needs to be extracted or distributed so each mobile user may conduct their own desired tasks. Classes may be added to the model to represent real world entities contained in the back end system. Classes may include, for example,: Customer, Order, Item, and Delivery. Fields may then be added to each class to describe attributes of individual class instances or records. Example fields may include: FirstName, OrderNumber, ItemDescription, and DeliveryAddress. Connections may then be added between classes to describe relationships between instances of those classes.

Once completed, a mobile data model may be made available to an administrator, which may be an individual, a collection of individuals, a software engine, or collection of code. In operation, the administrator may: (1) use the model to create a component, (2) add that component to a package, (3) add that package to an application, and (4) deploy that application to a particular user or many users. When a mobile user synchronizes and colonizes a hand-held device, at least a portion of the mobile data model may be instantiated on the device.

After an application is deployed to a mobile workforce and at least a portion of the mobile data model is instantiated on the device, a unifying understanding of data (e.g., schema or XML-like treatment) may exist throughout the mobile domain solution. As old hand-held devices are retired and new ones added, the new devices may be instantiated using the same mobile data model thereby addressing the problem of handheld product evaluation.

In addition to creating a unifying schema, the mobile data model may also wrap physical data stores with a logical interface. This logical interface may allow programmers easy access to data in a physical data store and may be modifiable.

Figure 11:
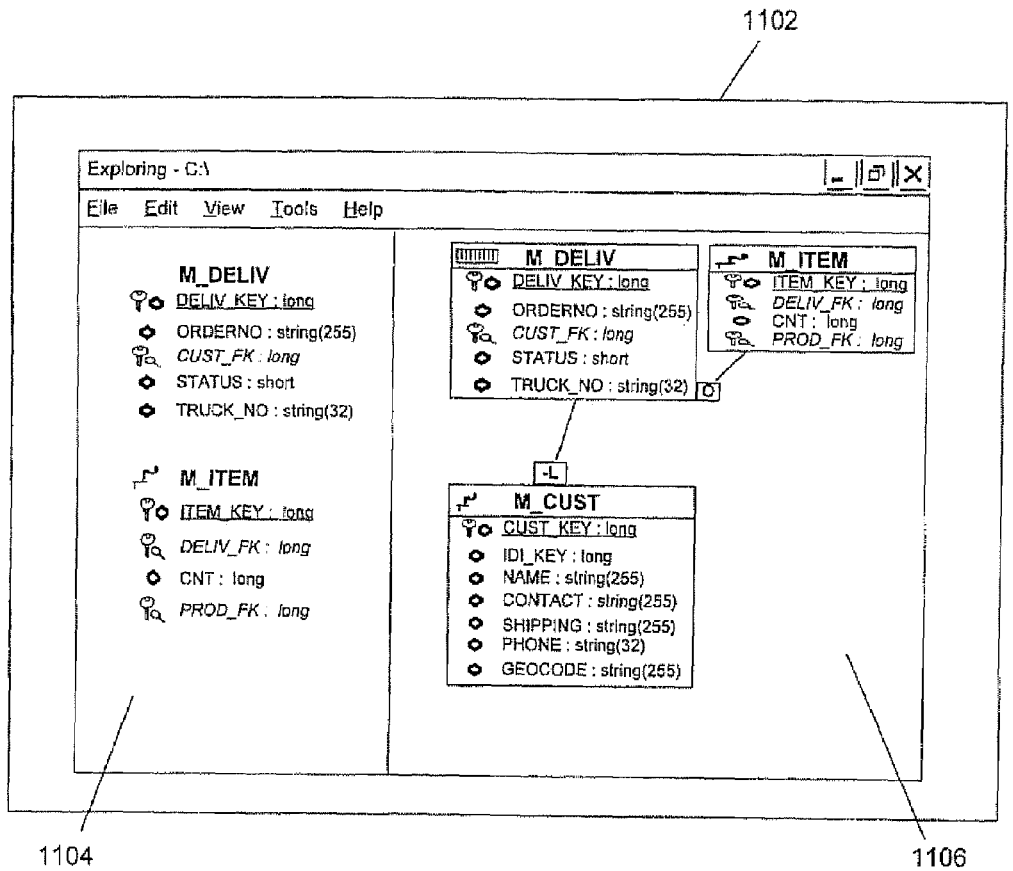
FIG. 11 depicts an example of a graphical user interface for a mobile data modeler that may allow a user to generate a mobile data model that incorporates teachings of the present disclosure.

As discussed above, a mobile data modeler may be a software tool that allows a user to create, edit, validate, print, and save a mobile data model. In one embodiment, a data modeler may present a graphical user interface (GUI) like GUI 1102 depicted in FIG. 11 that displays detailed information about a mobile data model as the data model progresses through development. A first pane 1104 of GUI 1102 may contain information about classes, keys, fields and connections presented in a simple linear list of textual entries. A second pane 1106 may provide a workspace where a user may begin to define the data model by placing classes, adding fields and connections. Preferably, GUI 1102 may also allow a user to switch between the physical and logical views of the data model.

Figure 12:
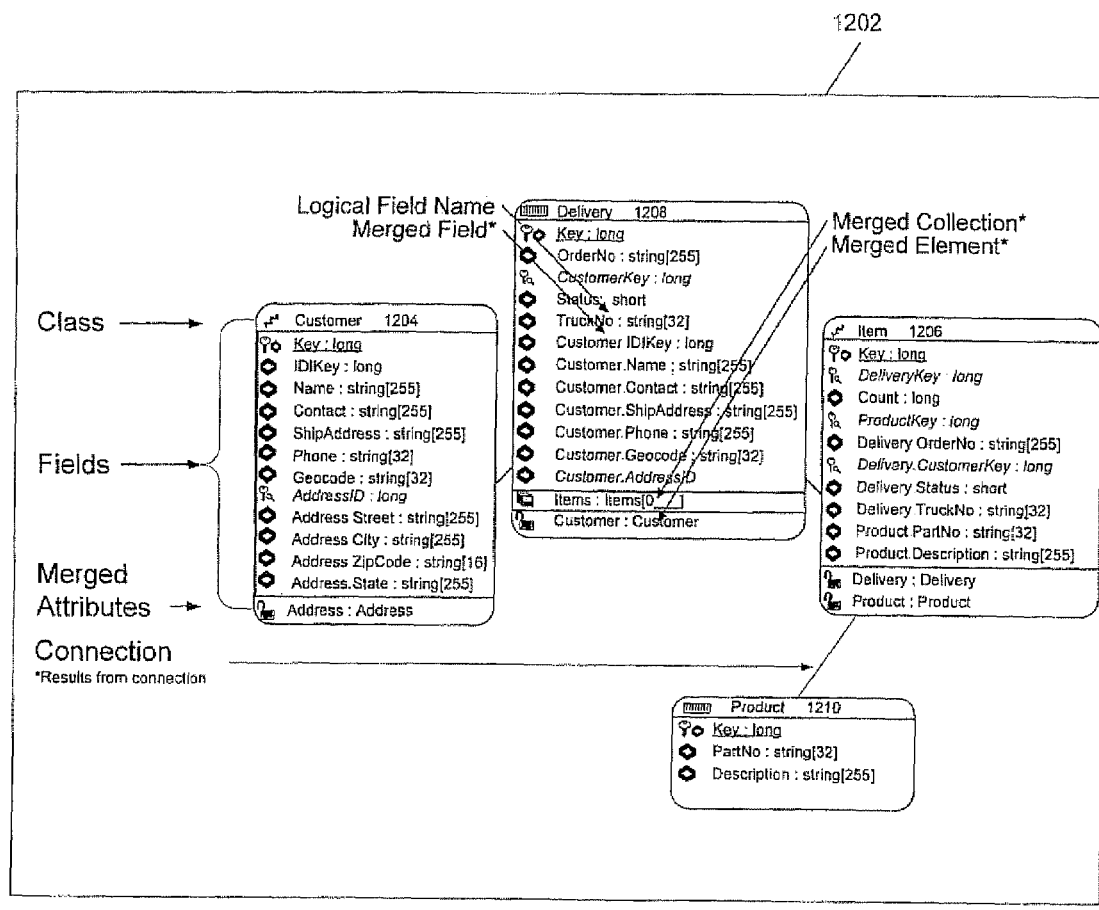
FIG. 12 shows a diagram of a mobile data model that incorporates teachings of the present disclosure.

When creating a mobile data model, a user may decide what real world entity or information to bring from a legacy system into the mobile domain. For example, if a mobile worker happens to be a forklift operator or truck driver, the worker may need to know customer order information stored in an enterprise back-end application so that deliveries can be made. The worker may need to have access to information about each order placed, including product number and quantity, and the delivery address. In such a situation, a user creating a mobile data model, like mobile data model 1202 of FIG. 12, may decide to include customers 1204, items 1206, deliveries 1208, and products 1210 as classes in the mobile data model.

A class in a mobile data model may represent some real world object, place, thing, person, or collection and combination thereof. It may be used to create a physical table or group of tables in a data store that will hold physical instances of those objects, places, things, or combinations, in records. Because class names in the data model may be used to instantiate physical tables in a data store, a developer should consider naming limitations of the particular data base management system (DBMS). For example, the following tables describe some common naming limitations.

| | SQL 6.5 | SQL 7.0 | ADOCE | Satellite Forms |
|---|---|---|---|---|
| Maximum table (physical class) name length | 30 | 128 | 31 | 8 |
| Valid characters in physical names | A-Z0-9__#$ | A-Z0-9__@#$ | A-Z0-9__ | A-Z0-9__ |
| Maximum physical field name length | 30 | 128 | 84 | 10 |
| Maximum fields per table | 250 | 1024 | 255 | |
| Maximum foreign key constraints per table | 31 | 253 | | |
| Maximum indexes per table (including Primary Key) | 249 | 249 | 4 | |
| Maximum fields per index | 16 | 16 | 1 | |
| Valid characters in physical names | A-Z0-9__#$ | A-Z0-9__@#$ | A-Z0-9__ | A-Z0-9__ |

Figure 13:
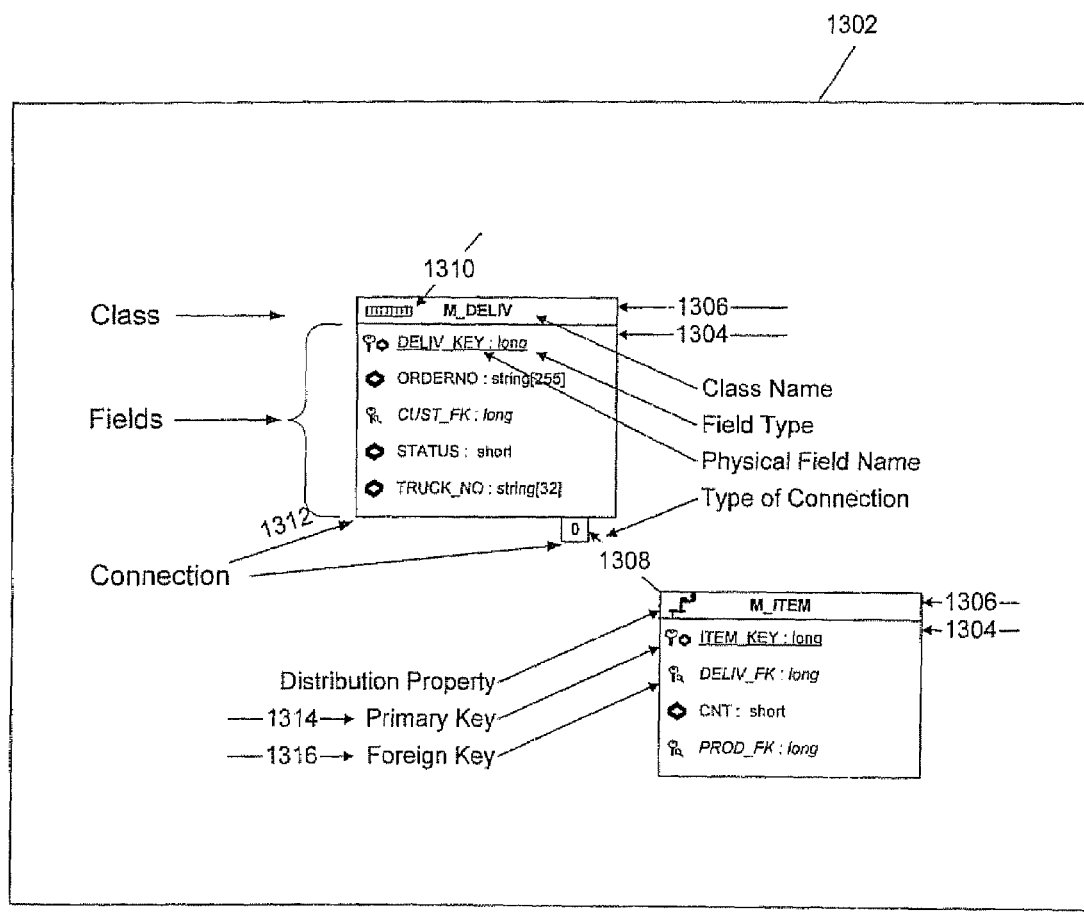
FIG. 13 shows a diagram of a mobile data model that incorporates teachings of the present disclosure.

After a developer has determined which entities may be required to support the mobile workforce and classes have been added to the modeler, the developer may decide what information is to be includes in each class to describe instances (records) of this class. As shown in FIG. 13, the developer may enter these attributes into a mobile data model 1302, as Fields 1304. A field may be an attribute of a class 1306 that describes one characteristic of the real world object that the class represents. For example, if the class is Customer, a field could be Name.

As mentioned above, there may be at least two views in the mobile data modeler, a physical view and a logical view. The physical view may give the developer a clear look at the physical properties of the model. It may also provide the developer with an indirect view of the physical data store, because the physical view may instantiate the data store. As shown in FIG. 13, a physical model may consist of Classes 1306, Fields 1304, and Connections 1308.

The name of the class, shown in the title bar may be the name used when instantiating a table in a data store (e.g., M_DELIV). Left of the name maybe a distribution property icon 1310, which may indicate how and to whom information should be distributed. Below the title bar in the body of the class may be a list of field names, their types, and icons 1312 that indicate the role this field may play in the table. For example, in FIG. 13, a primary key 1314, of which there may be only one per table, may uniquely identify each row in a table instantiated from mobile data model 1302. Similarly, foreign key 1316 may provide an indication of a field's value and type.

As discussed above, classes may represent the real world entities in an enterprise system like: Delivery, Customer, Items, and Products. Taken separately each class may instantiate a table that will hold instances of this class. The fields may describe attributes of these instances. For example, the table instantiated from a Customer class may hold Customer instances or records. One such record might have a value for its NAME field of "ABC Hardware". An instance of a Products class might have a value for its DESCRIPTION field of "Big Hammer".

Each instance may relate to one or more instances in another table. For example, a Delivery instance will likely relate to a Customer instance. A physical relationship between two tables may allow the two tables to be joined or to combine related records from two tables into a new or merged set. Mobile data models may also include connections that may create a physical relationship between instances of classes and may join together the instances to create sets of information for data distribution to the mobile users. Connections may additionally provide a simple logical interface to programmers for accessing a data store.

In some embodiments, there may be at least four types of connections in the modeler that reflect four standard types of physical relationships between tables in a relational DBMS. These connection types may include ownership, lookup, inheritance, and association. Each of these connection types may support data distribution in a different way. For example, ownership may support one to many distribution, lookup may support many to one distribution, inheritance may support one to one distribution, and association may support many to many distribution.

As mentioned above, there may be three phases a developer will complete when developing a mobile domain solution: (1) create a mobile data model that may allow instantiation of a domain data store and a mobile data store; (2) write an integration component that facilitates communication between a domain data store and a back-end application; and (3) write a client-side or mobile device bound mobile application that support interaction between a mobile data store and a user. In effect, the mobile data model may provide a layer of abstraction between a back-end database and a mobile application. As such, an integration component may access a domain data store instantiated from a mobile data model or a portion thereof, and a mobile applications may access a mobile data store instantiated from the same mobile data model or a portion thereof on an individual hand-held device.

Once the physical classes, fields, and connections have been added to a model using the Physical View and renamed using the Logical View, a mobile data model may give a developer clear insight into the relationships within a data store. It may also provide an excellent reference for the syntax when writing code that accesses the data store.

As discussed above, a developer may use a mobile data modeler to create a new mobile data model from inception. Preferably, a mobile data modeler will also allow a developer to create a new mobile data model using an existing enterprise database to provide the design requirements. Even if a back end database or system is available, a developer may not want to rely on a one-to-one mapping of the database objects when creating a mobile data model. The original design of the enterprise system may not include the requirements for a mobile domain solution and/or may include unnecessary information.

Mobile Data Model Development Example

Figure 14:
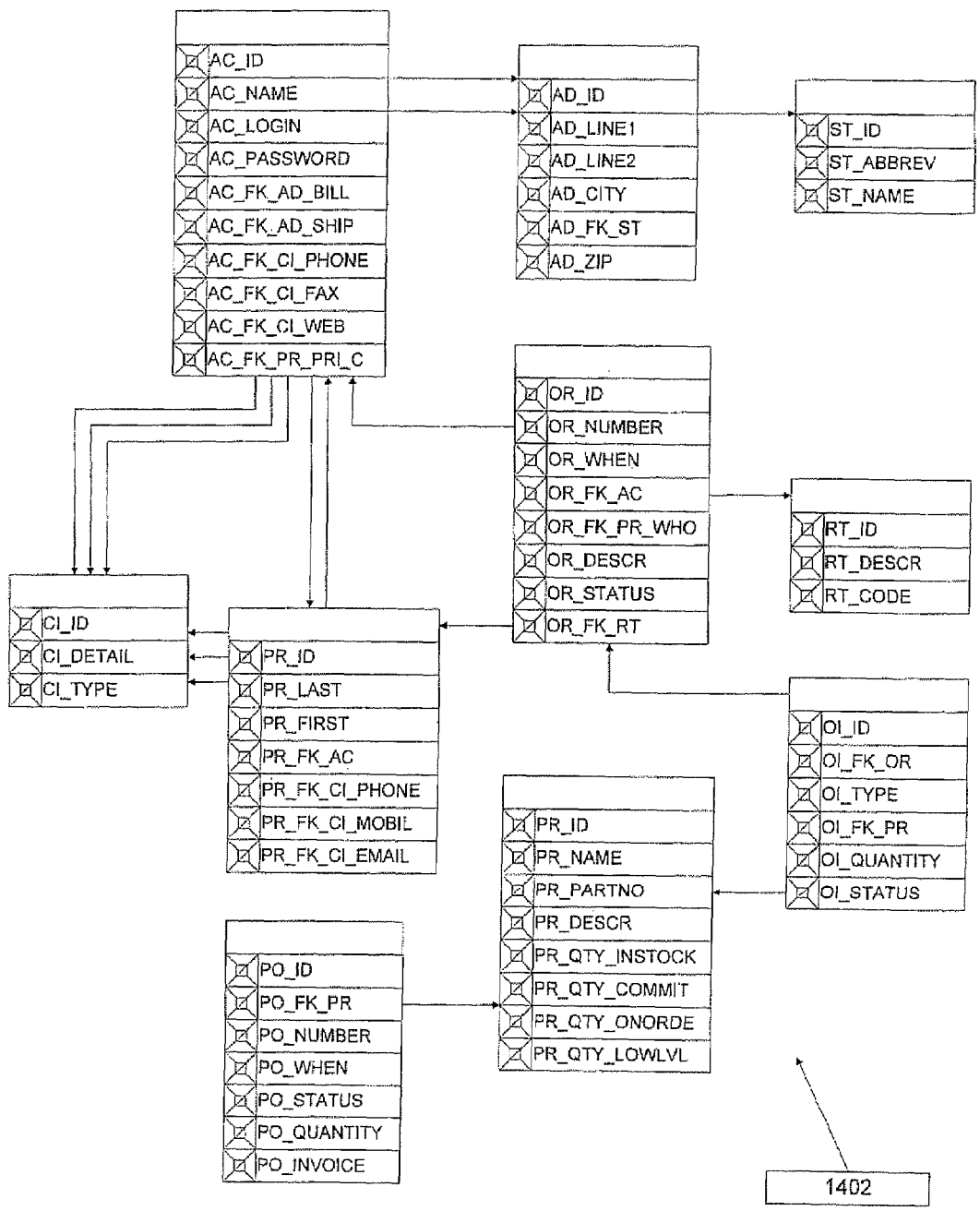
FIG. 14 depicts a relational schema for an enterprise information system that may be written in Structured Query Language (SQL) Server and may be translatable into a mobile data model that incorporates teachings of the present disclosure.

A developer may study an enterprise's requirements and determine that the following entities need to be modeled in the mobile domain: Deliveries (similar to customer Orders), Items in the Delivery, Product Information about the items, and Customers. The developer may also determine that the enterprise information system happens to be written in Structured Query Language (SQL) Server and has a relational schema similar to schema 1402 of FIG. 14.

Figure 15:
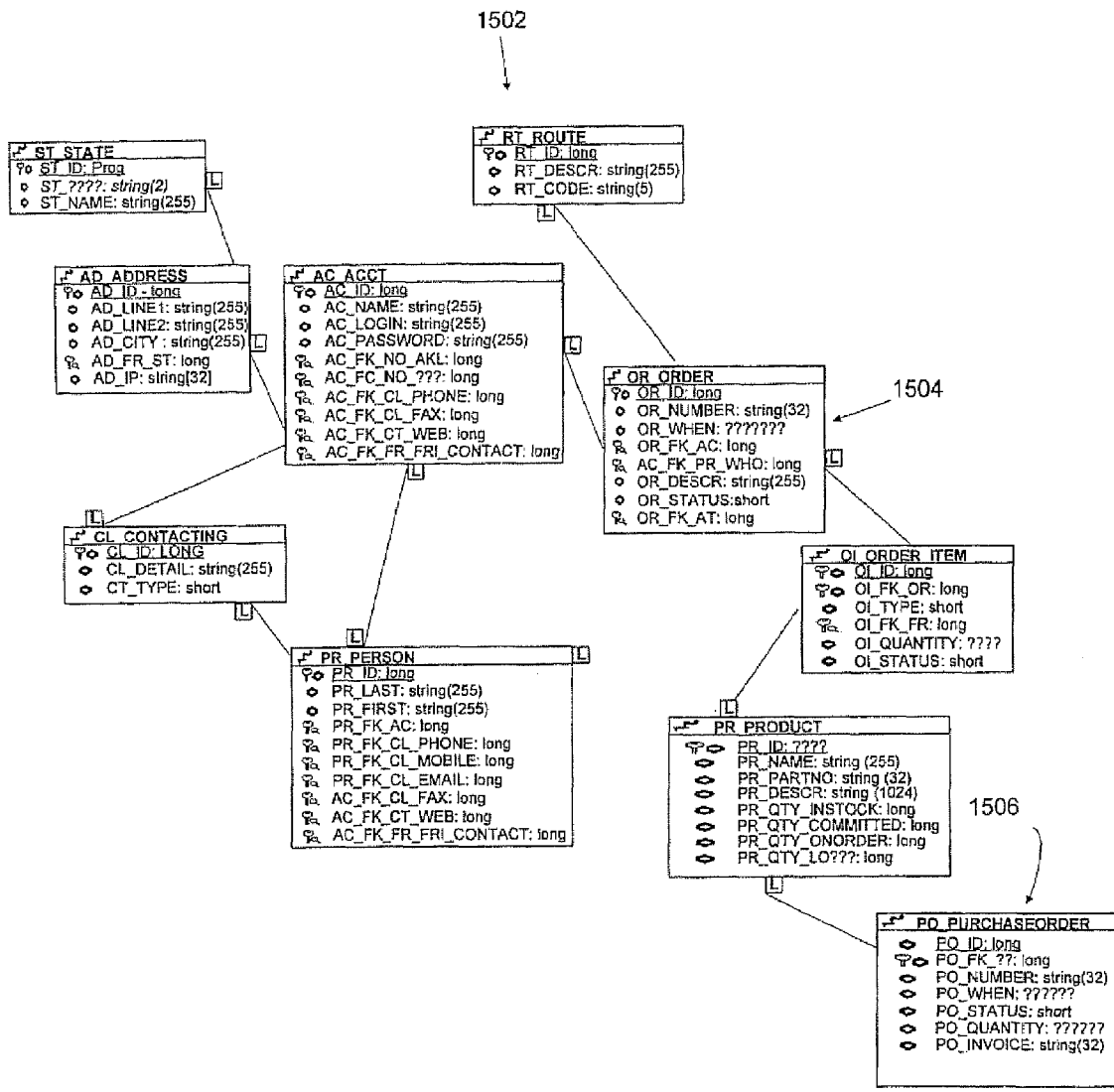
FIG. 15 depicts a relational schema similar to that of FIG. 14 translated into a mobile data model that incorporates teachings of the present disclosure.

The developer may elect to use a mobile data modeler to derive a mobile data model from the enterprise database or information system. The mobile data model in this example may be similar to mobile data model 1502 of FIG. 15. In model 1502, the physical tables from the enterprise system have been mapped using a one-to-one correspondence. Each of the physical fields and their data types may now be represented in mobile data model 1502, and each of the physical relationships from the enterprise system may now appear in model 1502 as a Lookup connection identified with an "L" (see L 1504 ).

The developer may determine that there is at least one extraneous table. For example, perhaps a mobile workforce does not need to know about purchase orders used to fill inventory and that this class 1506 may be deleted from mobile data model 1502. Similarly, specific mobile workers may not need all the available information. For example, a forklift operator may not need to know when the order was placed.

The developer may also notice that information describing a customer is stored using five separate tables: AC_ACCT, PR_PERSON, CI_CONTACTINFO, AD_ADDRESS, ST_STATE. The developer may decide to collect all of that information with an SQL query and place it into one class called Customer. See, for example, mobile data model 1602 and class 1604 entitled M_CUST of FIG. 16. In addition, the developer may also desire to modify the connection types and the physical names.

Figure 16:
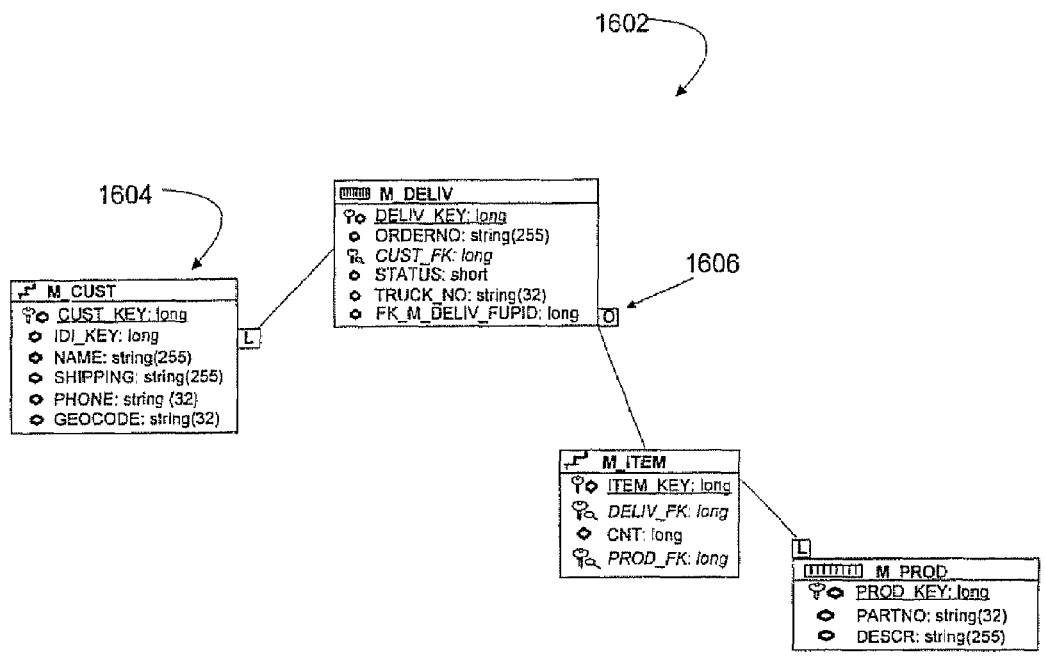
FIG. 16 depicts a pruned mobile data model that incorporates teachings of the present disclosure.

As shown in FIG. 16, the developer may elect to rename the classes OR_ORDER, OI_ORDERITEM, PR_PRODUCT to M_DELIV, M_ITEM, and M_PROD respectively— adding the M to indicate that the data model is a Mobile data model. Using both the relational schema and the derived classes, the developer may add fields and assign data types that are consistent with the various fields in the physical tables. The developer may also delete the classes and connections that are not in use and/or incorrect, and may then add connections back having appropriate types. For example, the M_DELIV class of FIG. 16 may have an ownership connection 1606 identified with an "O" to the M_ITEM class.

As discussed above, the mobile data model may be delivered to a Mobile Domain Administrator, where it may be treated as a component, added to a package, and made available for inclusion into an application. A user may then elect to add it to an application with specific destination properties, and the mobile data model or at least a portion of it may be deployed as part of the package. There may be two general types of applications with which to deploy the package containing the mobile data model or at least a portion of it. One type may hold an integration component and another type may hold a mobile application. Preferably, both types of applications will share at least a portion of the same mobile data model.

Once an application holding a mobile user application is deployed, the mobile users receiving that application may synchronize their hand-held devices and colonize. This act of colonizing on a hand-held device may result in the instantiation on the device of a mobile data store described by the portion of the mobile data model distributed to that handheld device and mobile worker. In preferred embodiments, distinct mobile workers may share a single device and may have individualized access to a given mobile application and underlying mobile data store. Once the first mobile user colonizes, the mobile data model may be said to be in production-time.

As the use of the mobile domain solution matures, modifications to the solution may be warranted. For example, an enterprise may elect to include new types of mobile employees and new classes might have to be added to the existing model to support these new user types. Because the mobile data data model can represent the underpinnings of an unifying schema, the model may be re-deployed to all users or just to those new users added to the solution.

Once a mobile data model has been built, the developer can build one or more software program components that will operate on the mobile computing devices. These components, or software instances, may be built using a variety of programming languages, depending on the device in question. The chief role of these components may be to manage the graphical user-interface that presents data to the device user as well as to implement the business logic required for basic user interaction and automation. Each device component may access application programming interfaces (APIs) provided by the mobile computing system in order to access information instances stored in the mobile domain, as well as to access various low-level services. As application requirements change, the developer may enhance the device components as needed.

Although the present invention has been described by way of detailed examples and illustrative embodiments, it should be understood that various changes, substitutions, and alterations can be made hereto without departing from the spirit and scope of the invention. Accordingly, the invention is not to be limited by the above detailed description, but rather is defined by the appended claims and equivalents thereof, to the maximum extent permissible by law.

What is claimed is:

1. A method, comprising:
   distributing a software platform to a first enterprise, the software platform for use in connection with an enterprise computing system having a plurality of backend software applications;
   distributing the software platform to a second enterprise;
   the software platform including a data modeling program including:
      a mobile data model generator configured to create a first mobile data model including a first set of classes and a second mobile data model including a second set of classes, the first set of classes including some but not all of an available set of classes in an enterprise data store, the second set of classes including some but not all of an available set of classes in the enterprise data store, the second set of classes different from the first set of classes;
      an application development engine configured to generate instructions, operable to reference one or more data elements, data relationships, data dependencies and data distribution attributes of the mobile data models when interfacing with a backend application, for deployment to a distributed computing platform and that allow the distributed computing platform to access information within a locally saved first mobile data store, the first mobile data store based on the first mobile data model and allow the distributed computing platform to access information within a second mobile data store, the second mobile data store based on the second mobile data model; and
      a mobile messenger layer configured to receive first data transactions associated with the first mobile data store and second data transactions associated with the second mobile data store and to alter an enterprise data store based on the first and second data transactions.

2. The method of claim 1, wherein the first data model is decoupled from a particular mobile software application and a particular backend application.

3. The method of claim 1, wherein the software platform is distributed to the first enterprise using a first distribution mechanism and the software platform is distributed to the second enterprise using a second distribution mechanism.

4. The method of claim 1, wherein the first enterprise is in a different primary industry category than the second enterprise.

5. The method of claim 1, further comprising receiving monetary value from the first and the second enterprises in connection with the distribution of the software platform.

6. The method of claim 1, wherein the software platform includes a development environment that allows creation of a software application that references the first mobile data model.

7. The method of claim 6, wherein the software application is a task specific software application targeted for use by a selected class of employees of an enterprise associated with the enterprise computing system.

8. The method of claim 7, wherein an employee using one of the mobile computing devices provides information so that the employee is authenticated as belonging to the selected class so that such employee is given access to the first software application.

9. The method of claim 1, wherein the software platform is integrated with a backend software application of the first enterprise.

10. The method of claim 1, wherein the software platform is integrated with a backend software application of the second enterprise.

11. The method of claim 1, wherein the mobile messenger application is configured to receive a first updated data model, and is configured to alter the first mobile data model based on the first updated data model.

12. The method of claim 11, wherein the first updated data model includes a third set of classes different from the first set of classes and the second set of classes.

13. A system integration method comprising:
    integrating a first computing system into a first enterprise network, the first computing system comprising:
       a first integration unit operable to access a backend application of the first enterprise network, the integration engine further operable to access a first mobile data store based on a first mobile data model, the first mobile data model including a first set of classes, the first set of classes including some but not all of an available set of classes in an enterprise data store;
       a first connection unit responsive to a first plurality of mobile computing devices, at least one of the first plurality of mobile computing devices having access to the first mobile data model data store; and
    integrating a second computing system to a second enterprise network, the second computing system comprising:
       a second integration unit operable to access a backend application of the second enterprise network, the integration engine further operable to access a second mobile data store based on a second mobile data model, the second mobile data model including a second set of classes, the second set of classes including some but not all of an available set of classes in the enterprise data store, the second set of classes different from the first;

a second connection unit responsive to a second plurality of mobile computing devices, at least one of the second plurality of mobile computing devices having access to the second data model data store; and developing a mobile software application for deployment on a mobile computing device, the mobile software application operable to reference one or more data elements, data relationships, data dependencies and data distribution attributes of the mobile data models when interfacing with a backend application.

14. The method of claim 13, further comprising providing integration services in connection with integrating the first computing system into the first enterprise network.

15. The method of claim 14, farther comprising receiving monetary value in connection with providing the integration services.

16. The method of claim 13, further comprising receiving monetary value in connection with integrating the first computing system.

17. The method of claim 13, wherein the first computing system further comprises a data management module in communication with the first integration unit and with the first connection unit.

18. The method of claim 13, wherein transaction data is transferred asynchronously between the plurality of mobile computing devices and the first connection unit.

19. The method of claim 13, wherein integration transaction data is transmitted between a data management module and the first integration unit.

20. The method of claim 19, wherein integration transaction data is transmitted between the first integration unit and the back-end application.

21. The method of claim 19, wherein the back-end application is selected from the group consisting of an accounting program, a database program, an enterprise resource management program, and a customer relationship management program.

22. A method, comprising:
receiving a software platform at a first enterprise, the software platform for use in connection with an enterprise computing system having a plurality of backend software applications;
the software platform including a data modeling program including:
a mobile data model generator configured to create a first mobile data model including a first set of classes and a second mobile data model including a second set of classes, the first set of classes including some but not all of an available set of classes in an enterprise data store, the second set of classes including some but not all of an available set of classes in the enterprise data store, the second set of classes different from the first set of classes;
an application development engine configured to generate instructions, operable to reference one or more data elements, data relationships, data dependencies and data distribution attributes of the mobile data models when interfacing with a backend application, for deployment to a distributed computing platform and that allow the distributed computing platform to access information within a locally saved first mobile data store, the first mobile data store based on the first mobile data model and allow the distributed computing platform to access information within a second mobile data store, the second mobile data store based on the second mobile data model; and
a mobile messenger layer configured to receive first data transactions associated with the first mobile data store and second data transactions associated with the second mobile data store and to alter an enterprise data store based on the first and second data transactions.

23. The method of claim 22, further comprising licensing the software platform from the provider.

24. The method of claim 22, further comprising distributing the software platform to another party.

25. The method of claim 22, further comprising using the software platform.

26. The method of claim 22, further comprising making copies of the software platform.

27. The method of claim 22, further comprising securing the right to distribute the software platform.

28. The method of claim 22, further comprising bundling the software platform with other software to create a bundled package.

29. A method comprising:
receiving a software platform, the software platform including a data modeling program including:
a mobile data model generator configured to create a first mobile data model including a first set of classes and a second mobile data model including a second set of classes, the first set of classes including some but not all of an available set of classes in an enterprise data store, the second set of classes including some but not all of an available set of classes in the enterprise data store, the second set of classes different from the first set of classes;
an application development engine configured to generate instructions, operable to reference one or more data elements, data relationships, data dependencies and data distribution attributes of the mobile data models when interfacing with a backend application, for deployment to a distributed computing platform and that allow the distributed computing platform to access information within a locally saved first mobile data store, the first mobile data store based on the first mobile data model and allow the distributed computing platform to access information within a second mobile data store, the second mobile data store based on the second mobile data model; and
a mobile messenger layer configured to receive first data transactions associated with the first mobile data store and second data transactions associated with the second mobile data store and to alter an enterprise data store based on the first and second data transactions; and
hosting the software platform on a server.

30. The method of claim 29, further comprising receiving monetary value in connection with hosting the software platform.

31. The method of claim 29, further comprising deploying at least a portion of the first mobile data store to a plurality of mobile computing devices.

* * * * *

UNITED STATES PATENT AND TRADEMARK OFFICE
CERTIFICATE OF CORRECTION

| | | |
|---|---|---|
| PATENT NO. | : 7,313,782 B2 | Page 1 of 1 |
| APPLICATION NO. | : 09/848952 | |
| DATED | : December 25, 2007 | |
| INVENTOR(S) | : Marc Lurie et al. | |

It is certified that error appears in the above-identified patent and that said Letters Patent is hereby corrected as shown below:

Column 16, Line 12, change "84" to --64--

Column 21, Line 15, change "farther" to --further--

Signed and Sealed this
Eighteenth Day of October, 2011

David J. Kappos
*Director of the United States Patent and Trademark Office*